United States Patent
Waite et al.

(10) Patent No.: US 7,834,801 B2
(45) Date of Patent: Nov. 16, 2010

(54) SENSOR FUSION FOR MODEL-BASED DETECTION IN PIPE AND CABLE LOCATOR SYSTEMS

(75) Inventors: James W. Waite, Las Gatos, CA (US); Ruwan Welaratna, San Francisco, CA (US)

(73) Assignee: Metrotech Corporation, Inc., Santa Clara, CA (US)

(*) Notice: Subject to any disclaimer, the term of this patent is extended or adjusted under 35 U.S.C. 154(b) by 222 days.

(21) Appl. No.: 11/193,100

(22) Filed: Jul. 29, 2005

(65) Prior Publication Data

US 2006/0055584 A1    Mar. 16, 2006

Related U.S. Application Data

(63) Continuation-in-part of application No. 10/997,729, filed on Nov. 23, 2004, now Pat. No. 7,113,124.

(60) Provisional application No. 60/525,291, filed on Nov. 25, 2003, provisional application No. 60/592,835, filed on Jul. 29, 2004.

(51) Int. Cl.
    *G01S 13/89* (2006.01)
    *G01V 11/00* (2006.01)
(52) U.S. Cl. .................... 342/22; 324/329
(58) Field of Classification Search ............... 342/22; 324/326, 329
    See application file for complete search history.

(56) References Cited

U.S. PATENT DOCUMENTS 4,723,216 A    2/1988    Premerlani (Continued)

FOREIGN PATENT DOCUMENTS

EP    0 299 724 A2    1/1989

(Continued)

OTHER PUBLICATIONS

Doolittle, J. et al., "A comparison of EM Induction and GPR methods in areas of karst," Geoderma 85 (1998) 83-102.

(Continued)

*Primary Examiner*—Ian J Lobo
(74) *Attorney, Agent, or Firm*—Haynes and Boone, LLP

(57) ABSTRACT

Line locator systems that fuse traditional sensors used in a combined pipe and cable locator (electromagnetic coils, magnetometers, and ground penetrating radar antennas) with low cost inertial sensors (accelerometers, gyroscopes) in a model-based approach are presented. Such systems can utilize inexpensive MEMS sensors for inertial navigation. A pseudo-inertial frame is defined that uses the centerline of the tracked utility, or an aboveground fixed object as the navigational reference. An inertial sensor correction mechanism that limits the tracking errors over time when the model is implemented in state-space form using, for example, the Extended Kalman Filter (EKF) is disclosed.

55 Claims, 13 Drawing Sheets

U.S. PATENT DOCUMENTS

| | | | |
|---|---|---|---|
| 4,802,009 | A | 1/1989 | Hartmeier |
| 4,942,360 | A | 7/1990 | Candy |
| 5,025,227 | A | 6/1991 | Walton |
| 5,038,364 | A | 8/1991 | Motoori |
| 5,181,026 | A | 1/1993 | Granville |
| 5,194,812 | A | 3/1993 | Yokoi |
| 5,231,355 | A | 7/1993 | Rider et al. |
| 5,260,659 | A | 11/1993 | Flowerdew et al. |
| 5,262,639 | A | 11/1993 | Vokey et al. |
| 5,321,613 | A | 6/1994 | Porter et al. |
| 5,541,516 | A | 7/1996 | Rider et al. |
| 5,642,050 | A | 6/1997 | Shoemaker |
| 5,757,190 | A | 5/1998 | Mercer |
| 5,798,644 | A | 8/1998 | Eslambolchi et al. |
| 5,920,194 | A * | 7/1999 | Lewis et al. .................. 324/326 |
| 6,023,986 | A | 2/2000 | Smith et al. |
| 6,127,827 | A | 10/2000 | Lewis |
| 6,140,819 | A | 10/2000 | Peterman |
| 6,215,888 | B1 | 4/2001 | Eslambolchi et al. |
| 6,240,367 | B1 | 5/2001 | Lin |
| 6,310,579 | B1 | 10/2001 | Meredith |
| 6,396,433 | B1 | 5/2002 | Clodfelter |
| 6,407,550 | B1 | 6/2002 | Parakulam et al. |
| 6,411,073 | B1 | 6/2002 | Fischer et al. |
| 6,424,820 | B1 | 7/2002 | Burdick et al. |
| 6,529,006 | B1 | 3/2003 | Hayes |
| 6,549,011 | B2 | 4/2003 | Flatt |
| 6,735,263 | B1 | 5/2004 | Moriya et al. |
| 6,751,553 | B2 | 6/2004 | Young et al. |
| 6,756,783 | B2 | 6/2004 | Brune et al. |
| 7,057,383 | B2 | 6/2006 | Schlapp et al. |
| 7,062,414 | B2 | 6/2006 | Waite et al. |
| 7,113,124 | B2 | 9/2006 | Waite |
| 2002/0196177 | A1 | 12/2002 | Johansson et al. |
| 2003/0046003 | A1 | 3/2003 | Smith et al. |
| 2003/0058961 | A1 | 3/2003 | Fling et al. |
| 2004/0070399 | A1 | 4/2004 | Olsson et al. |
| 2005/0088301 | A1 | 4/2005 | Abbruscato |
| 2005/0096879 | A1 | 5/2005 | Waite et al. |
| 2005/0096883 | A1 | 5/2005 | Pacey |
| 2005/0156776 | A1 | 7/2005 | Waite |
| 2005/0197755 | A1 * | 9/2005 | Knowlton et al. ............. 701/50 |
| 2006/0036376 | A1 | 2/2006 | Gudmundsson et al. |
| 2006/0214663 | A1 | 9/2006 | Mercer et al. |
| 2007/0288195 | A1 | 12/2007 | Waite et al. |

FOREIGN PATENT DOCUMENTS

| | | |
|---|---|---|
| EP | 299724 A2 | 1/1989 |
| EP | 0 780 704 B1 | 6/2001 |
| EP | 1 217 391 A | 6/2002 |
| RU | 2 152 059 C1 | 6/2000 |
| WO | WO 2005/015263 A1 | 2/2005 |
| WO | WO 2005/111662 A1 | 11/2005 |
| WO | WO 2006/015310 A2 | 2/2006 |
| WO | WO 2006/015310 A3 | 2/2006 |
| WO | WO 2007/106388 A2 | 9/2007 |

OTHER PUBLICATIONS

International Search Report and Written Opinion dated Nov. 26, 2004, received in PCT Application No. PCT/US2004/018935.
Office Action dated Jul. 6, 2005, received in U.S. Appl. No. 10/622,376.
Amendment and Response to Office Action dated Nov. 7, 2005, filed in U.S. Appl. No. 10/622,376.
Office Action dated Oct. 27, 2005, received in U.S. Appl. No. 10/997,729.
International Search Report and Written Opinion from PCT Application No. PCT/US05/27240 filed Jul. 29, 2005.
International Search Report and Written Opinion from PCT Application No. PCT/US2004/018935 mailed Nov. 26, 2004.
IPRP from PCT Application No. PCT/US2004/018935 dated Jan. 23, 2006.
Communication pursuant to Article 96(2) EPC from European Patent Application No. 04 776 559.9-2213 dated Jun. 7, 2006.
Application as filed in related U.S. Appl. No. 11/716,298.
International Preliminary Report on Patentability and Written Opinion dated Jan. 30, 2007, in International Application No. PCT/US2005/027240.
Response to Office Action filed Aug. 28, 2007 (Chinese version previously cited), in related Chinese application No. 200480020605.1.
International Search Report and the Written Opinion of related PCT Appl. No. PCT/US07/06045 mailed Feb. 20, 2008.
International Preliminary Report on Patentability of related PCT Appl. No. PCT/US07/06045 mailed Sep. 25, 2008.

* cited by examiner

SENSOR FUSION FOR MODEL-BASED DETECTION IN PIPE AND CABLE LOCATOR SYSTEMS

This disclosure is a continuation-in-part of U.S. patent application Ser. No. 10/997,729 filed Nov. 23, 2004, now U.S. Pat. No. 7,113,124 "Centerline and Depth Locating Method for Non-Metallic Buried Utility Lines". which claims priority to U.S. Provisional App. No. 60/525,291 filed on Nov. 25, 2003, by James W. Waite, each of which is herein incorporated by reference in its entirety. This disclosure further claims priority to U.S. Provisional App. No. 60/592,835 filed on Jul. 29, 2004, by James W. Waite, which is also herein incorporated by reference in its entirety.

BACKGROUND

1. Field of the Invention

The present invention relates to the enhancement of traditional cable location methods by a fusion of electromagnetic sensors and/or ground penetrating radar sensors with inertial sensors in a state-space framework.

2. Discussion of Related Art

Underground pipe and cable locators (sometimes termed line locators) based on electromagnetic (EM) methods have existed for many years, are well known, and are relatively easy to use. EM line location usually involves a conductive target cable or pipe so that the target cable or pipe can carry an AC current. Ground-penetrating radar (GPR) may be utilized to locate conducting or nonconducting pipes and cables. However, the widespread use of GPR has (in part) been limited by the difficulties in interpretation of the typically graphical output of such systems, which are much more complex than EM locators.

EM line locator systems typically include a mobile, handheld receiver and a transmitter. The transmitter can be coupled to a target conductor, either by direct electrical connection or through induction, to provide a current signal on the target conductor. The receiver detects and processes signals resulting from the electromagnetic field generated at the target conductor as a result of the current signal. The signal detected at the line locator receiver can be a continuous wave sinusoidal signal related to the target signal on the target conductor generated by the transmitter.

The transmitter is often physically separated from the receiver, with a typical separation distance of several meters or in some cases up to many kilometers. The transmitter couples the current signal, whose frequency can be user selected from a selectable set of frequencies, to the target conductor. The frequency of the current signal applied to the target conductor, which can depend on conductor type, can be referred to as the active locate frequency. The target conductor generates an electromagnetic field at the active locate frequency in response to the current signal.

In EM line location systems, the signal strength parameter determined from detection of the electromagnetic field provides a basis for derived quantities of the current signal (i.e., the AC current in the targeted conductor), position of the line locator receiver relative to the center of the conductor, depth of the conductor from the line locator receiver, and can also be used as the input to a peak or null indicator (depending on the orientation of the magnetic field to which the detector is sensitive).

For detection of cables or pipes laying in a continuous path (e.g., buried in a trench or occupying an underground conduit extending over some distance), an assumption is often made that the induced magnetic field is concentric around the cable and that signal strength is dependent only on the local ground conductivity, the depth and horizontal position of the target cable, and the magnitude of AC current flowing in the cable. When this is the case, the electromagnetic field at the detector of the line locator, on which the signal strength depends, is said to be free of distortion.

Nearly all EM locators present a "peak" indication that results from a horizontally oriented coil, with axis orthogonal to the direction of the cable that has a maximum deflection over the presumed centerline of the cable, assuming the ideal undistorted field. Some locating systems also present a "null" output from a vertically oriented coil, which has a minimum at the same position, again making the same ideal assumption about the magnetic field. Yet other locating systems create a null response by horizontally aligning two coils and subtracting the output of one from the other. The intent in all these coil configurations is to create coil responses to the induced magnetic field that lead to the deduction of the target conductor position.

Often in a crowded underground utility environment of metallic pipes and cables, coupling of signals at the active locating frequency from the target conductor to other adjacent underground conductors can occur. These conductors (lines) are not intended to be tracked by the line location system, but coupling of currents from the target conductor to those neighboring conductors through various means (resistive, inductive, or capacitive), termed "bleedover," can lead a line locator astray such that the operator of the line location system ceases tracking the targeted conductor (e.g., pipe or cable of interest) and instead begins following an adjacent line. In some cases, there may be bias in the targeted conductor's estimated centerline as a result of distortion due to bleedover.

A disadvantage with relying solely on an EM line locator device for determining the location and depth of a target conductor is that the locator may fail to identify and distinguish among various utility conduits and conductors. EM line locator devices especially may fail to locate non-conductive lines, such as, for example, gas lines, fiber optic lines and plastic water lines when those lines are not marked with trace wires.

Ground penetrating radar (GPR) systems have also been used for utility locating applications. However, such systems present to the user a fairly complex grey-scale or color image of the radar pulse echo amplitude in a 2-D map of depth vs. horizontal ground position. This type of display is useful in survey and mapping applications, but provides far too much information for the ordinary user trained in line location techniques. In conventional GPR systems, the results that signify the presence of underground utility lines are often not available until after post processing of the image data collected on an external computer.

Conventional GPR systems focus on collection of data, and not the detection and tracking in real-time of an individual utility line and therefore provide highly complex displays of that data. Conventional EM line locator user interfaces are designed with easy; displays for infrequent use. The locate technician must be able to pick up the instrument after sporadic use and be able to immediately track a specific line though an unfamiliar area. The line location is often marked with paint in response to the indications presented on the display. The painted location should have accuracy within accepted (and sometimes legal) guidelines. Images of the data that are presented to the user are constantly changing as the user is walking the locator down the line. Further, features presented in the images are often inconsistent and unrecognizable when these maps are presented in real-time to the user. Using conventional methods without off-line image processing, centerline errors of a few centimeters are attainable with EM line locators but are not achievable with a GPR line locator.

Depth of the target utility line is an important parameter in any locating task. The locate operation often precedes a digging operation and the result of the locate determines how deep a backhoe operator can dig without impacting the utility line. To achieve acceptable depth accuracy, conventional GPR systems can be calibrated by locating a known underground object on the same test site (because soil conditions are generally identical between the calibration and the locate), and then digging down to the object to determine the exact depth. Without an absolute depth confirmation, GPR systems rely on a user-specified choice of the dielectric constant of the soil at the test site. Determining the dielectric constant of the soil is often difficult at best, resulting in depth determinations that are subject to 20% tolerances in this scenario. Further, cable and pipe locate operations typically involve a manual painting operation to indicate the location of the line. The digging crew later uses this marking as a guide to avoid damaging the cable while excavating. Unfortunately, markings are not permanent and therefore can not be relied on for future locates at the same site.

Therefore, there is a need for a dual-mode line locator that simultaneously offers both metallic (electromagnetic) and non-metallic (ground penetrating radar) location methods, particularly for the real-time location of the line's centerline and depth. There is a further need to process radar range data obtained from a GPR locate and present a simple user interface display, enabling an operator familiar with conventional EM line tracing methods to trace non-conductive lines with a GPR locator. There is a further need for a dual mode locator that can achieved equivalent centerline and depth accuracies for both metallic and non-metallic utility lines, in real-time, as a locate technician is walking the line and marking that line with paint. Further, there is a need for line locators that can provide more permanent records of the location of the line.

SUMMARY

In accordance with the present invention, a combined EM and GPR pipe and cable locator system is presented. Embodiments of the combined EM and GPR locator can include a fusion of inertial, electromagnetic, and radar sensors that enables improved position estimation of targeted hidden conductors. As such, some embodiments of the invention include the ability to simultaneously locate both conductive and non-conductive cables and pipes. Further, some embodiments of the present invention allow similar ease of use in both EM line location mode and GPR line location mode. Further, some embodiments of the present invention can achieve equivalent centerline and depth accuracies for both metallic and non metallic utility lines as the user is walking the line. Further, in some embodiments the location and depth of the utility line can be stored to form an electronic map.

A line locator system according to the present invention includes one or more field sensors to detect a field from an underground line; one or more inertial positioning sensors; and a filter that fuses signals from the one or more field sensors and the one or more inertial positioning sensors to provide position and field values. In some embodiments, the filter is a Kalman filter. The field sensors can include one or more electromagnetic field sensors and/or one or more ground penetrating radar sensors. In some embodiments, the filter treats the one or more field sensors and the one or more inertial positioning sensors as loosely coupled sensors. In some embodiments with ground penetrating radar sensors, there may be two detecting antennas. In some embodiments, the filter treats the one or more field sensors and the one or more inertial positioning sensors as tightly coupled sensors. In some embodiments, the filter treats the one or more field sensors and the one or more inertial positioning sensors as ultra-tightly coupled sensors. In some embodiments, the depth of the underground line is continuously calculated.

In some embodiments, the one or more inertial position sensors includes sensors chosen from the group consisting of accelerometers, gyroscopes, magneto resistive sensors, and digital compasses. In some embodiments, the system can include a GPS receiver to provide an absolute position.

In some embodiments, the filter, in each time period, provides an updated state vector based on signals from the one or more field measurement sensors and the one or more inertial position sensors. In some embodiments, the state vector X includes position, velocity, angular orientation, and bias parameters. In some embodiments, the angular orientation parameters are quaternion parameters. In some embodiments, the state vector also includes a depth parameter formed of the underground line. In some embodiments, the state vector also includes a depth parameter formed by the product of a current in the underground line and the depth of the underground line. In some embodiments, the state vector also includes a velocity parameter. In some embodiments, the state vector further includes both a velocity parameter and a depth parameter. In some embodiments, the state vector includes linearized parameters from an EM mode. In some embodiments, the state vector includes linearized parameters from a GPR mode. In some embodiments, the state vector is updated according to $X=AX+BU$, where A is the state transition matrix, B is the input mapping matrix, and U is the forcing function vector.

In some embodiments, the system can include a mapping module that stores position and field values to create an electronic map of the position of the underground line. In some embodiments, the system can include one or more position locator devices, wherein the one or more position locator devices determine the position of the line locator system relative to a fixed point. In some embodiments, the one or more position locator devices includes one or more of a group consisting of a GPS system, a laser rangefinder, and stereoscope range finder. In some embodiments, the one or more position locator devices communicates with the line locator through a wireless interface.

A method of locating an underground line according to some embodiments of the present invention include measuring one or more field values; measuring one or more inertial navigation values; and fusing the one or more field values with the one or more inertial navigation values to obtain accurate values for the location of the underground line. In some embodiments, measuring one or more field values includes measuring one or more values of magnetic field strength. IN some embodiments, measuring one or more field values includes measuring one or more values of time for signal return in a ground penetrating radar system. In some embodiments, measuring one or more inertial navigation values includes measuring one or more parameters for a set consisting of linear acceleration, angular acceleration, and Earth magnetic field direction.

In some embodiments, fusing the one or more field values with the one or more inertial parameter values includes: forming a state vector from the one or more inertial parameter values; receiving one or more external position parameters; and utilizing a Kalman filter to update the state vector. In some embodiments, the method further includes performing a walkover determination utilizing the one or more field values.

In some embodiments, fusing the one or more field values with the one or more inertial parameter values includes: forming a state vector from the one or more inertial parameter values; and updating the state vector utilizing a Kalman filter and the one or more field values. In some embodiments, fusing the one or more field values with the one or more inertial parameter values includes forming a state vector from the one or more inertial parameter values and the one or more field values; and updating the state vector utilizing a Kalman filter.

These and other embodiments are further discussed below with reference to the following figures.

Figure 1A:
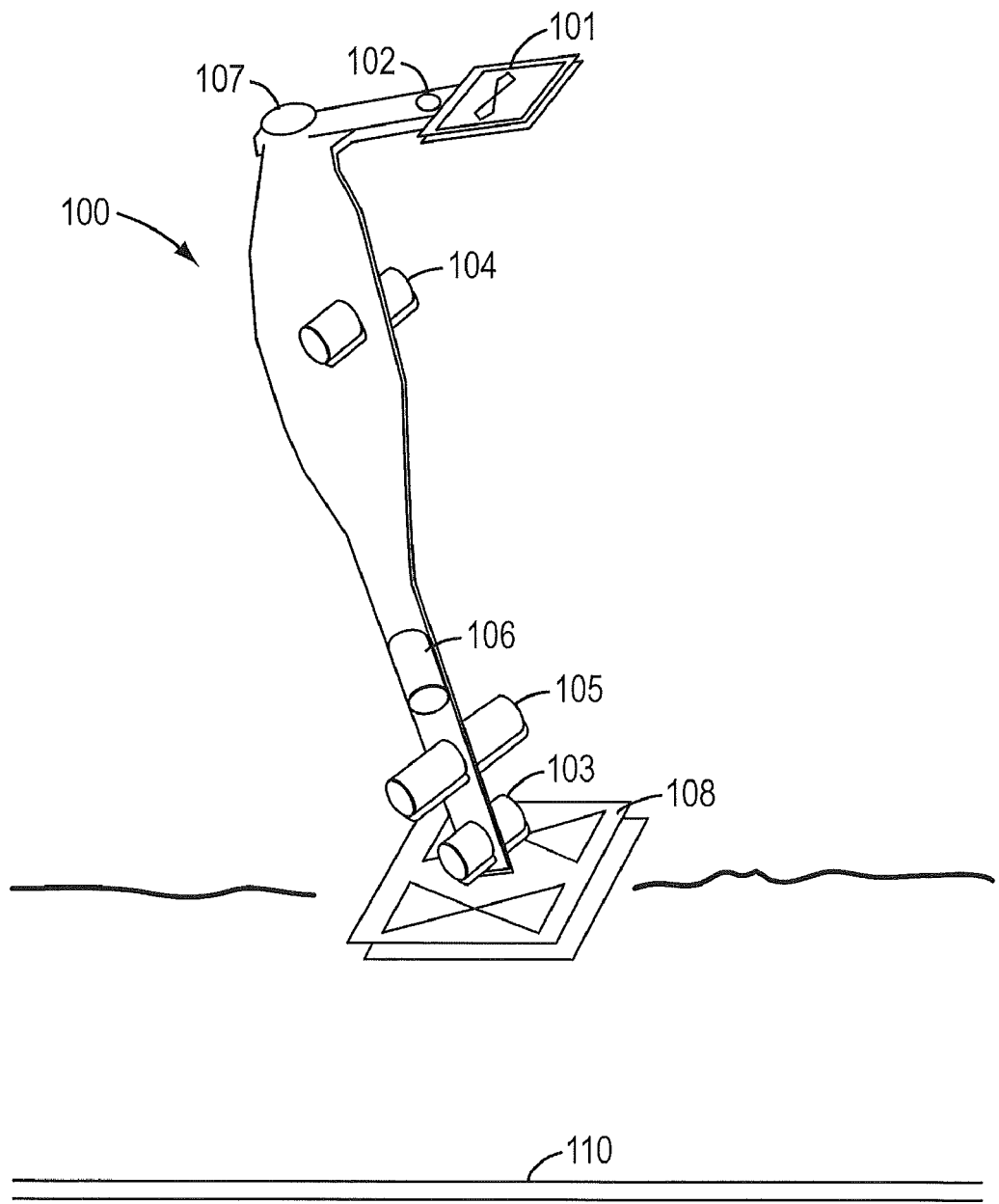
FIG. 1A shows a schematic view of an embodiment of line locator according to the present invention with combined handheld electromagnetic (EM) and ground penetrating radar (GPR) locator modes.

In the figures, elements having the same designation have the same or similar functions. Elements in the figures are not drawn to scale.

DETAILED DESCRIPTION

Various methods have been employed on EM locators to ensure that the results presented to the user (depth, centerline, and AC current) associated with the target conductor are accurate. The traditional rule of thumb is that the peak field measurement of the center of the line, determined by detectors arranged to measure horizontal fields, and the null field measurement of the center of the line, determined by detectors arranged to measure vertical fields, should not differ by more than a couple of centimeters or so. If those measurements differ by more than this threshold, the field is distorted and the predicted centerline could be in error. U.S. Pat. No. 6,815,953, (the '953 patent) by Russell N. Bigelow, and assigned to Metrotech Corporation, which is herein incorporated by reference in its entirety, discloses a method of comparing three point measurements in space and determining an error function based on how well the measured magnetic field conforms to the assumed model.

U.S. patent application Ser. No. 10/842,239 (the '239 application), by Hubert Schlapp and Johan Överby, and assigned to Metrotech Corporation, as well as U.S. patent application Ser. No. 11/100,696 (the '696 application), by Thorkell Gudmundsson, et al, and assigned to Metrotech Corporation, both of which are herein incorporated by reference in their entirety, discloses how a precise location of a targeted conductor is possible even when distortion exists. The "walkover" method utilizes a reasonably accurate measurement of off-centerline position, which when combined with magnetic field measurements, allows an optimization process to determine the expected centerline and depth of the target cable.

In conventional EM locators, it has thus been shown that combining in situ magnetic field measurements with position measurements can result in more accurate locate results, or at the least provide warnings to the user that distortion is present and the measured locate results may be in error. In conventional locators, the position measurements and the field measurements have been made using physically separate sensor systems, and the results of those measurements are combined in later processing.

An EM line locator that includes an inertial position measurement device is described in U.S. patent application Ser. No. 10/407,705 (the '705 application) "Buried Line Locator with Integral Position Sensing", by Gordon Pacey and assigned to Metrotech Corporation, which is herein incorporated by reference in its entirety. The '705 application discloses utilization of accelerometers to derive position estimates, for the purpose of mapping magnetic field irregularities. The position estimates are used specifically in a mapping sense, and are not used to create refined estimates of the actual target conductor position. As in the '953 patent, the focus of the '705 application is on how well the measured magnetic field conforms to the assumed single conductor model.

U.S. patent application Ser. No. 10/997,729 "Centerline and Depth Locating Method for Non-Metallic Buried Utility Lines", by James W. Waite, assigned to Metrotech Corporation, of which the present application is a continuation, discloses a combined EM and GPR locator. The '729 application is herein incorporated by reference in its entirety. The locator disclosed in the '729 application includes inertial sensors capable of tracking the centerline of an underground cable or pipe, regardless of whether the target line is conductive or not. As disclosed, the inertial sensors in the locator disclosed in the '729 application can be utilized to reduce the complexity of the GPR display to a simple "Left/Right" indication of the location of the cable, which provides a display substantially identical to that offered in the EM locator mode.

Some embodiments of the present invention refine the in situ position measurements made by a locator in a way that fuses the position measurements in an optimal way with magnetic field measurements. Such a refinement allow for more precise location of an underground conductor. Therefore EM line location methods can become more reliable in the presence of distortion by including spatial measurement sensors, including inertial sensors, with field measurement sensors. Such a refinement can be accomplished, for example, using a Kalman filter (KF).

It is well known that a Kalman filter can optimally combine physical sensors according to a defined model. A Kalman filter is an estimator of the state of a linear dynamic system. A straightforward extension called the Extended Kalman filter (also used in embodiments of the present invention) can estimate the state of a non-linear dynamic system that has been linearized around the instantaneous values of the state variables. An introduction to the application of Kalman filters for a wide variety of problems is found in *Kalman Filtering, Theory and Practice Using Matlab* ($2^{nd}$ ed.), by Mohinder S. Grewal and Angus P. Andrews, Wiley Inter-Science, 2001, which is herein incorporated by reference in its entirety. One of the most important attributes of Kalman filters applied to the present problem of EM/GPR sensor fusion is that it allows the estimation of parameters (states) that are not directly observable, and can do so by integrating observable information that is acquired on timescales that are different from the estimation process. Kalman filters as applied to line location according to embodiments of the present invention, are governed by the notation and state equations described below.

Using a Kalman filter, line locators according to some embodiments of the present invention combine the EM and GPR sensor inputs with an inertial subsystem to provide reliable off-centerline position estimates. As a result, such embodiments can present an intuitive display interface to the user. Further, accurate data regarding the location and depth of the underground line can be recorded to develop an electronic map. Some embodiments allow the visual presentation of left/right line deviations in substantially the same visual elements that guide a user during the tracking of metallic lines using electromagnetic methods. Furthermore, in some embodiments, the same inertial subsystem can be used in the EM line locate mode to detect when simple one-conductor models for depth and current calculations are not adequate to describe the data.

Some embodiments of the present invention may include micro-electromechanical system (MEMS) or other miniature sensor technologies to provide an inertial subsystem. Advances in inexpensive MEMS sensors (e.g., accelerometers, gyroscopes, and other such devices), and other miniature sensors utilizing system-on-chip technology (magneto-resistive sensors, digital compasses), often utilized for inertial navigation, have resulted in a plethora of tracking solutions related to navigation and robotics. However, such applications require some method of correcting or accounting for sensor biases; otherwise, inferred parameters like velocity, position, and attitude quickly become inaccurate due to single or double integration of the bias during processing of the data received from the sensors.

Some embodiments of the present invention utilizing MEMS or miniature sensors utilizing system-on-a-chip technology can reliably detect the location of underground utilities by fusing the signals received from traditional sensors used for pipe and cable location (e.g., electromagnetic coils, magnetometers, and radar antennas) with the signals received from low cost inertial sensors (e.g., accelerometers, gyroscopes, and compasses) using a model-based approach. In some embodiments, a pseudo-inertial frame can be defined that facilitates an inertial sensor correction mechanism, limiting tracking errors over time when the model is implemented in state-space form using, for example, a Kalman filter.

In a cable locating system, there are three scenarios that embody various levels of sensor fusion. Drawing upon terms popular in the Global Positioning System (GPS) aided inertial measurement field, the three scenarios are termed loosely, tightly, and ultra-tightly coupled sensor systems. But in terms of embodiments of the present invention, the descriptions of the three scenarios extend the sensors encountered in such aided inertial systems to include electromagnetic coils, magnetometers, radar antennas, and other field measurement sensors commonly used in underground line locating systems.

In the loosely coupled scenario for an inertial and EM sensor fused system, a fixed-location aboveground reference point is used as the pseudo-inertial coordinate frame reference. In combination with earth magnetic heading information, this reference point is used to fix the estimated centerline of the underground utility in an earth-fixed coordinate frame. As was discussed in the '239 application that utilized a model with a 1-dimensional (straight line) horizontal walkover transect of the expected cable location, a very accurate estimate of the centerline and depth of the targeted conductor can be obtained. During the walkover, incremental position estimates relative to the aboveground object are derived simultaneously with the electromagnetic field measurements on the same handheld platform. This scenario is termed "loosely coupled" because the inertial position estimates are independently determined without assist from or reference to the electromagnetic field measurements. Then, according to separate signal processing methods such as that described in the '696 patent application, the position estimates are "fused" in an optimization framework that results in precise position detection of the targeted conductor based on a model relating the relavent field with position. With aiding sensors (GPS, laser rangefinders, or stereoscopic vision sensors), the position estimates can be tied to any of the common earth-fixed coordinate systems. Further, digital compasses or magnetometers that sense the earth's magnetic field can provide heading information to tie the walkover direction to the chosen coordinate system. Other examples of loose coupling between the inertial system and either or both of the EM and GPR sensor systems are related to mapping applications. Such applications are discussed in the '705 application and the '953 patent.

In the "tightly coupled" scenario, a 2-dimensional pseudo-inertial coordinate frame is formed that is centered at ground level over the position of the targeted cable. In this case, an earth-fixed frame is not required, since the sensor-fused system referenced to this position allows direct implementation of theoretical field models, for example electromagnetic field models in the case of a locator operating in the EM mode. One outcome of the tightly coupled sensor fused system is the ability to continuously calculate the target conductor depth. Traditional (non-continuous) methods of determining depth estimates (as described, for example, in U.S. Pat. No. 6,815,953) assume models in which the magnetic field conforms to a one-conductor model, so that the peak of the signal at ground level can be taken as an indication of the targeted conductor centerline. Simple depth measurements can be performed when the locator is positioned over the centerline. In the mathematical model of this ideal one-cable behavior, the magnetic field structure follows a predictable shape away from the centerline. In the sensor fusion scenario according to some embodiments of the present invention, a Kalman Filter can utilize observations of the magnetic field strengths, detected from electromagnetic coil sensors, to improve inertial system estimates of off-centerline distance during the process of swinging the locator. Swinging the locator helps to identify the centerline since a null is sensed at the centerline of the target line by the locator. In turn, the position values can be used to continuously calculate the target line's (in this example a conductor) depth, which represents an advantage compared to existing methods that perform depth measurements only when the locator is positioned over the centerline of the target line.

The tightly coupled scenario has a similar benefit for line locators with a GPR locating mode. The fundamental measurement of a GPR system is the round trip travel time of a radar ping to/from the target line. So, while skimming the GPR antennas over the centerline (so that good coupling into the ground can be achieved), the measured 2-way travel time from the radar system is used to update the inertial system. Then, a filter such as a Kalman filter can be utilized to estimate off-centerline distance that are used to calculate the depth of the target (possibly non-conductive) line continuously. The radar signal velocity can be previously calibrated utilizing the EM system, using a metallic line target while both EM and GPR systems are active and setting the depth as measured by the EM system equal to the depth as measured by the GPR system.

In the "ultra-tightly coupled" sensor system, a 2-dimensional electrodynamics model (for an embodiment of locator that includes inertial and electromagnetic sensors) can be extended to a fully fused model of inertial and electromagnetic sensors. The dynamic behavior of the inertial sensors can be merged into a single state-space EM field model that is dependent on depth, current, and centerline position of the target cable. This modeling provides more robust estimators of fit errors in the model. For example, for the hypothesis testing methods described in the '696 application, embodiments of the present invention can provide a discriminator output that operates on the state vector and covariance matrix of the Kalman Filter. This model quality metric can be used to support the hypothesis that there is only one source conductor that can create such an observed field. If the hypothesis is not supported, the single conductor scenario can be rejected and the user can be directed to switch modes and use the batch optimization methods such as those discussed in the '696 "walkover" patent application.

For the GPR locating mode, ultra tight coupling can refer to a system such that the 2-way travel time measurements are used to update a sensor fused state-space model consisting of the radar velocity and the inertial states. The benefit of this approach allows constant update of the radar velocity, which (depending on soil conditions) can vary from about a few centimeters per nanosecond (cm/ns) up to about 25 cm/ns. The radar velocity is frequently updated at all off-centerline positions, enabling an accurate depth measurement at the centerline.

In some embodiments, a unified state-space model can be considered for a combined EM and GPR locator, which shows the form of an ultra-tightly coupled sensor fusion system that simultaneously includes inertial, EM, and GPR states in the model. This approach is particularly useful with a conductive utility line, which can be detected by both the EM and GPR system, and has application to on-site calibration of the GPR depth algorithm. In addition, since the Kalman Filter represents an excellent way of combining disparate physical sensors, overall accuracy is improved by jointly processing the EM, GPR, and inertial data in such a filter.

In all three sensor fusion scenarios that fuse inertial, electromagnetic, and radar measurements, the forward direction (parallel to the direction of the cable or pipe) is not pertinent to the problem of finding the centerline or depth of a long, continuous target cable. However the model and associated aiding methods discussed below are equivalently relevant for the forward direction, and the stated models generally include that additional dimension for completeness.

The sensor models and physical dynamics are similar for embodiments of all three coupling scenarios, with the primary differences falling in the area of what information is used to estimate the biases and thereby improve the prediction of the state. Both electromagnetic and ground penetrating radar cable locating systems are similarly improved by the described embodiments because the models that describe the position (centerline, depth) of the targeted conductor are very similar between such systems. The state-space models for the two types of locating systems change only in minor ways, but the filter structure (particularly with respect to the inertial elements) remains the same.

FIG. 1A illustrates a handheld line locator 100 according to some embodiments of the present invention. Handheld line locator 100 in FIG. 1A includes both EM and GPR location methods and thus is a dual mode locator. Some embodiments of the present invention may be single mode locators in that they include only one of the EM mode and the GPR mode, but not both. As discussed above, a dual mode locator can be utilized to locate both metallic and non-metallic utility lines. Out of view of the locate technician operating locator 100 is a buried utility line 110. If an active EM signal from a transmitter (not shown) has energized the line 110, the induced magnetic field is essentially concentric around line 110 and coils 103 (bottom reference), 105 (left/right), and 104 (top) generate signals that are processed, for example using methods previously disclosed in U.S. patent application Ser. No. 10/622,376 (the '376 application), "Method and Apparatus for Digital Detection of Electromagnetic Signal Strength and Signal Direction in Metallic Pipes and Cables", by James W. Waite and Johan D. Överby, which is herein incorporated by reference in its entirety. On some systems a null coil 106 is included and, in some embodiments, replaces the left/right coils 105. Display 101 and speaker 107 can alert the user to the signal strength, left/right deviation from centerline, and depth to the conducting line. In some embodiments, coils 103, 105, 106, and 104 can each include multiple detector coils. The detector coils included in coils 103, 105, 106, and 104 can be any detectors capable of detecting a magnetic field of specific orientations. Such detectors are well known in the art.

The depth of line 110 can be calculated by the ratio of signal levels between the top and bottom coils, for example using an algorithm described in the '953 patent. In some embodiments, the depth accuracy can be better than 5% using the method described in the '953 patent for depth measurements up to about 4 meters and reasonable signal levels.

In some embodiments, the user can interact with handheld locator 100 via hard-key and pointing device 102, which can also be used to switch between operational modes (e.g., EM and GPR modes) of locator 100. In GPR mode, coils 103, 105, 106, and 104 are normally inactive in order to save battery life of locator 100. In some embodiments, the GPR tracked line is assumed to be non-metallic. However, if power usage is not an issue, coils 103, 104, 105, and 106 can remain active. In some embodiments, simultaneous operation of EM and GPR modes can be utilized, for example when it is impossible to gain access to the conducting line in order to directly couple a transmitter signal, or when the transmitter signal is very weak (i.e., far from the receiver, and the signal is low due to capacitive losses to ground). In either case, antennas 108 are active in GPR mode, with common DSP based processing electronics present within the locator body 100.

Antennas 108 can be bowtie antenna pairs (one transmit and one receive), or could optionally include three bowtie antennas, with a transmit antenna equidistant between two receive antennas. Most bow-tie antennas are a derivative of the biconical antenna. The discone is half a biconical antenna. The bowtie is a planar (and therefore directional) antenna. The length of the antenna determines its frequency response, since the antenna pattern distorts at frequencies higher than the design value. Thus all bowtie antennas have an optimum frequency band. For GPR systems, this operational band is typically in the range of 100 MHz to 2 GHz, however embodiments of the present invention can utilize any operational band.

Though bowtie antenna pair 108 is normally made of copper foil, little interference effect is seen by the EM coils 103, 105, and 104. This is because an energized line creates a concentric magnetic field around line 110 according to the right hand rule, and thus all the EM coils are exposed to maximum signal when the locator is aligned along the line to be tracked. Note for the configuration of locator 100 highlighted in FIG. 1A, the maximum EM strength signal results when the antenna assembly is directly positioned over the centerline. In GPR mode, the maximum signal also is received when locator 100 is directly over the centerline because the 2-way travel time of the radar pulse is a minimum at the centerline of the target line.

Figure 1B:
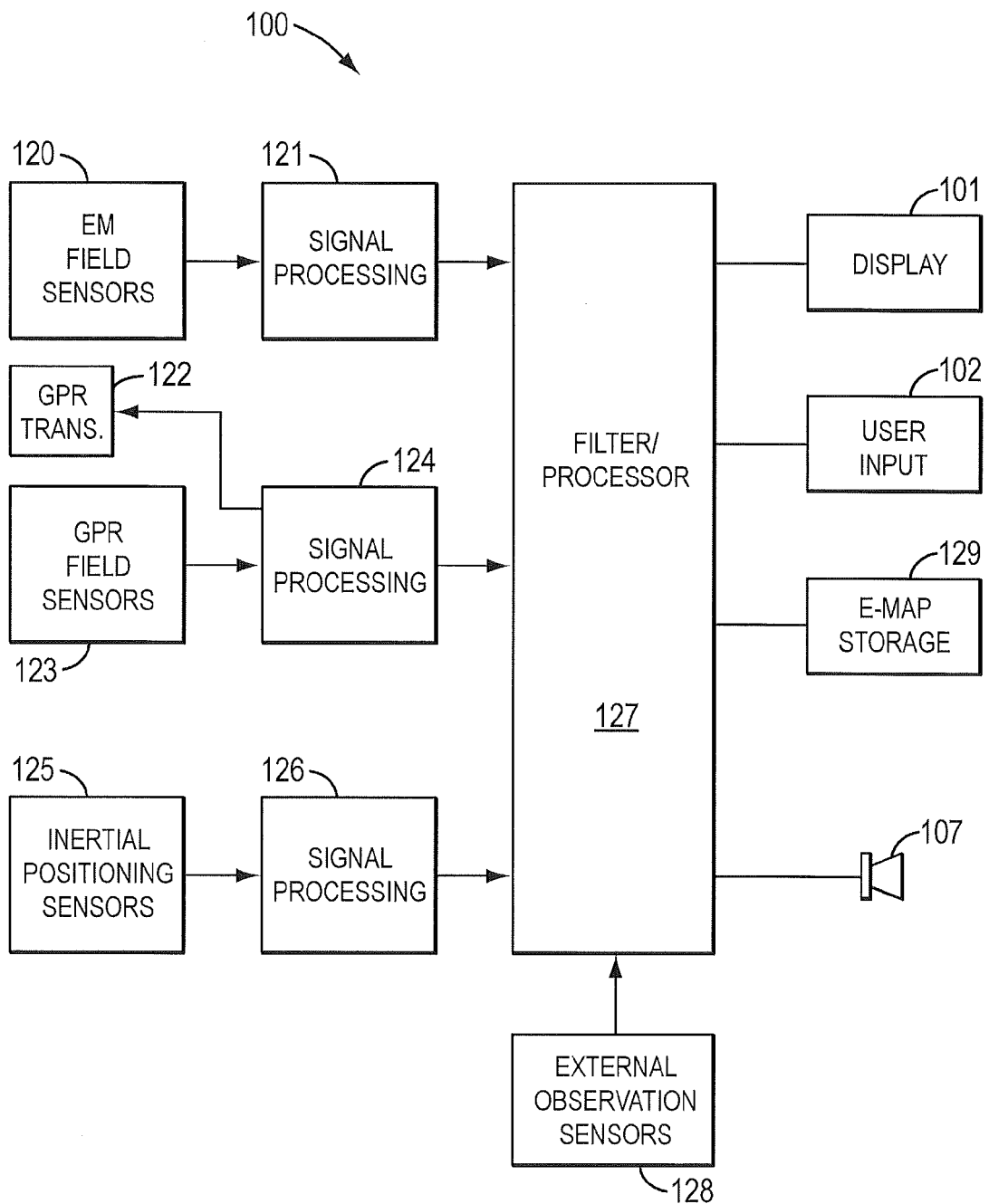
FIG. 1B shows a block diagram of a line locator according to some embodiments of the present invention.

FIG. 1B illustrates a block diagram of an embodiment of a line locator 100 according to the present invention. The embodiment of line locator 100, as shown in FIG. 1B, includes EM field sensors 120, GPR field sensors 123, and inertial positioning sensors 125. EM field sensors 120, as illustrated in FIG. 1A, can include one or more sensors such as coils 103, 105, 106, or 104. The signals from EM field sensors 120 are input to signal processing 121. Signal processing 121 generates digital signals appropriate for input to processing 127 and may further include amplification and filtering functions. GPR field sensors includes antennas such as antennas 108 that receive signals from line 110. A GPR signal is generated in GPR transmitter 122, which also may include a GPR antenna. GPR transmitter 122 is controlled by signal processing 124. Further, signals from GPR field sensors 123 are received into signal processing 124, which provides digital signals related to the GPR round-trip times to processing 127.

Inertial positioning sensors 125 can include, for example, accelerometers, gyroscopes, and digital compasses. In some embodiments, inertial positioning sensors 125 can include 3-axis accelerometers, 3-axis gyroscopes, and 2 to 3 axis digital compasses. Such an arrangement can provide data regarding the acceleration of line locator 100 along three orthogonal linear axis, rotational acceleration of locator 100 around the three orthogonal linear axis, and orientation of locator 100 with respect to the earth's magnetic field. Signals from inertial positioning sensors 125 are input to signal processing 126, which provides corresponding digital signals to processor 127.

Processor 127 includes memory for storing data and processing instructions and a digital processor that executes the processing instructions. Processor 127 performs the filtering described below for the loosely coupled, tightly coupled, and ultra-tightly coupled processing in EM mode, GPR mode, or dual (EM and GPR) mode, as specified by the user. Processor 127 is coupled to provide information to display 101 and speaker 107, receive information from the user through user input 102, and control operation of the EM field sensors 120, GPR field sensors 123, GPR transmitter 122, and inertial positioning sensors 125. Processor 127 may be microprocessor based or may perform some functions by hard-wired circuitry.

In embodiments that include a loosely coupled EM or GPR mode, for example for walkover analysis, external observation sensors 128 may also be included. As discussed below, external observation sensors 128 may be incorporated in the same housing as line locator 100 or may be separated and communicate with line locator 100, for example by wireless communication. External observation sensors 128 can be GPS systems, laser rangefinders, or other observation system that provides processor 127 with a location.

Additionally, some embodiments of line locator 100 may store the location of line 110 as it is being located in storage 129. The electronically stored position of line 110 can be utilized to form a permanent electronic map of the location of line 110 and can be utilized in future surveys of the site.

Figure 2A:
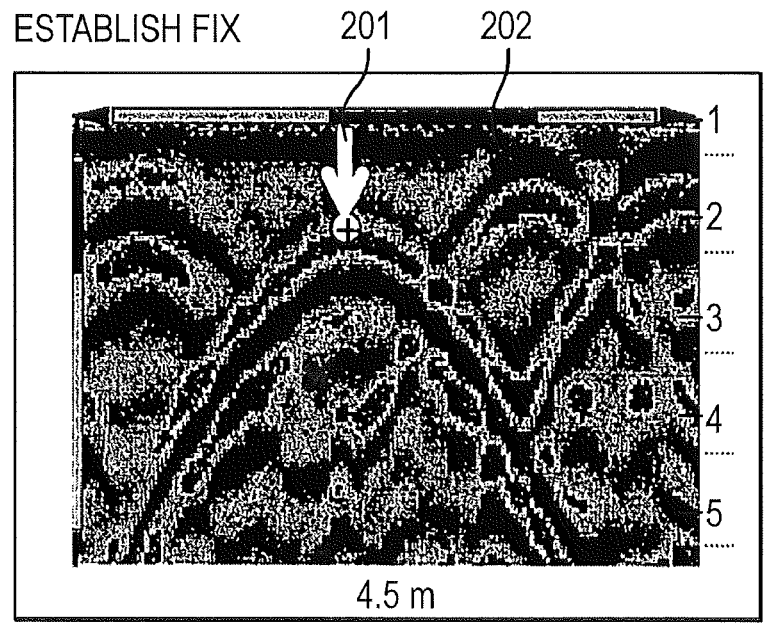
FIG. 2A illustrates an image that is typically utilized to depict GPR data.
Figure 2B:
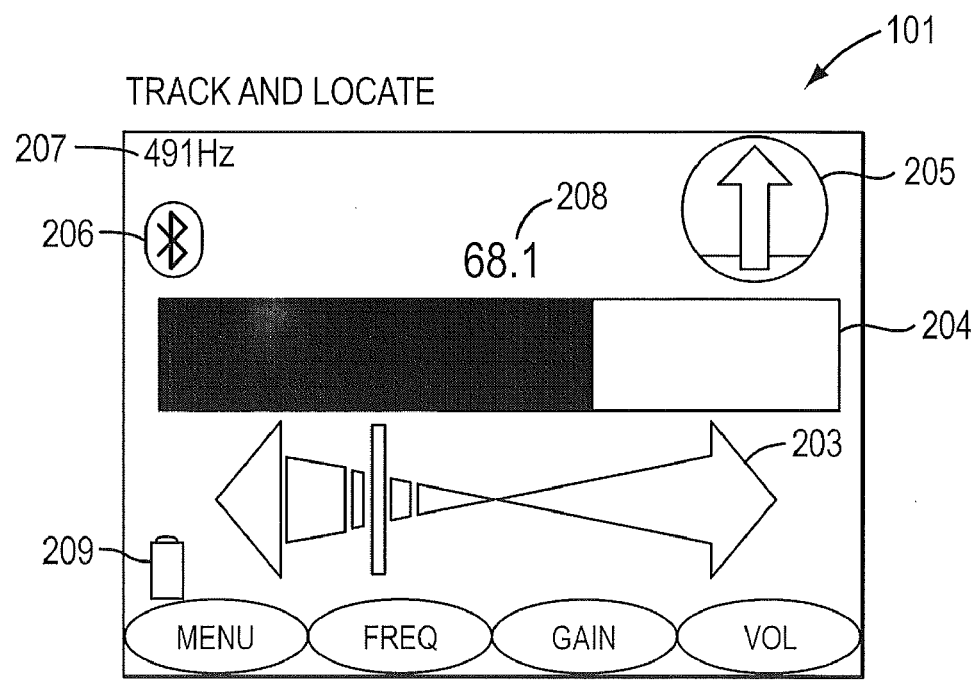
FIG. 2B illustrates a user interface for an EM mode line locator.

User interface 101 in EM line locate mode can be exceedingly simple, as the embodiment of such a display shown in FIG. 2B demonstrates. As shown in FIG. 2B, a primary display element can be the "proportional left-right" bar 203 that provides the user real-time feedback on how far off the centerline is from the locator. In normal operation the locator is swung left-right-left at a rate of about ½ to 1 Hz, and the vertical bar travels side-to-side with little perceptible latency. In some embodiments, the degree of divergence of the bar is logarithmically proportional to the distance from the centerline. Typical side-to-side travel distances of about ½ meter can cause the Left-Right needle to deflect about half way in some embodiments. The needle exponentially approaches the endpoints, such that in some embodiments about a 2-meter offset from centerline represents about a 95% deflection. In some embodiments, even an excursion of a few centimeters of line locator 100 from the centerline of line 110 can result in perceptible travel of the vertical bar. In some embodiments, Signal Direction indicator 205 presents feedback of the detected direction of current flow in tracked line 110, and provides the EM locator technician an alert that the signal may have been subject to capacitive bleed-over to adjacent conductors. Bar graph 204 and numeric readout 208 presents the Signal Strength measurement, which in addition to the Left-Right needle can also used to determine the centerline position. The concentric field lines emanating from the conductor result in maximum coil 203, 204 output at centerline, and fall off toward the side. The rate at which this occurs again depends on depth (reduced fall off with increased depth).

The remainder of features present on the EM line locator interface in FIG. 2B includes the display of the active transmitter frequency 207, and various icons that indicate the status of the locator (e.g., battery level 209 and state of wireless connections 206).

In some embodiments of the present invention, locator 100 additionally makes inertial measurements of acceleration and angular increment in one or more dimensions, and optionally the earth's magnetic field heading in two or three dimensions. Further, for the purpose of aiding the inertial measurements, locator 100 can also record one or more of GPS position, GPS velocity, laser rangefinder distance, or stereoscopic distance at the same location through external observation sensors 128. In this discussion, the device that makes these measurements (including those that arise from the EM and GPR sensors) is called the locator, though it is not essential that the sensors all reside within one mechanical package. For example, the locator may collect the laser rangefinder and GPS measurements of external observation sensors 128 via wireless interfaces (e.g., Bluetooth or other common protocol) as long as the relative position of external observation sensors 128 is known with respect to locator 100. The locator subsystem that measures the dynamic position, velocity, and heading (additionally using the aiding information) is called the Inertial Navigation System (INS). The INS subsystem that measures the acceleration, angular rate, and heading quantities is called the Inertial Measurement Unit (IMU). Both the INS and IMU are included with inertial positioning sensors 125 and signal processing 126 shown in FIG. 1B.

For embodiments of the EM locator subsystem, one embodiment of the fusion of inertial and electromagnetic coil sensors is the ability to provide a continuous depth estimate to the target conductor, even when the locator is not held over the centerline of the target during the depth calculation (as is done for prior art EM locating systems). A second benefit of the inertial subsystem is to help detect the presence of distortion in the electromagnetic field. Because the state-space equations describing the interaction of the inertial and EM sensors assumes a single conductor model, the bias terms in the model can be monitored online to detect when the single conductor model assumption is no longer a good assumption.

In GPR tracking mode, the user interface can be very similar to that shown in FIG. 2B. After a depth calibration (described below), the user must establish a fix on the target prior to "walking the line." Normally this happens just as for an EM locate, by traversing the area looking for a L/R deflection of bar 203. Many times a line can be tracked from a known source. For example, plastic water pipes are commonly used for irrigation systems, but these pipes generally terminate at a known distribution location. A reasonable tracking approach is to begin at the known location, establish a fix, and then begin walking the line while monitoring the left/right deflection.

In GPR mode, standing in one location and swinging the locator over the suspected position of the line can establish the fix. In more complicated cases, the user can walk locator 100 over a few meters and record the radar range data in a map, as is shown in FIG. 2A. Scroll bar 202 allows a review of the line just scanned which can represent several underground utilities or other objects. Though FIG. 2A is a busy presentation indicative of several buried pipes in the top 2 meters of soil, it is a repeatable measurement along a single axis—the user does not walk forward until the signature hyperbola is denoted as the line to be tracked. Furthermore, some embodiments of locator user interface 101 allow switching between the two views shown in FIGS. 2A and 2B easily, as data is being measured and displayed. Using the thumb operated pointing device 102, the white arrow 201 in FIG. 2A can be dragged to the hyperbola that represents the line to be fixed as the "tracked line." Once a button is pressed or other indication is made to tell locator 100 to track that line, then the FIG. 2B display can be selected and utilized to display GPR information rather than EM mode information, and the left/right swinging motion invoked in order to validate that the locator has a lock on the line using a combination of physical models, measured data, and a Kalman filter that combines all the sensor measurements in an optimal way.

For the GPR locator subsystem, with the help of sensor fusion utilizing the Kalman filter, residual errors in the target line detection process are monitored online to detect when the locator has lost the lock, as can occur when the line makes a sharp turn at an elbow joint, for instance. At this point the user can return to the "Establish Fix" display (FIG. 2A) and manually sweep the locator through the test field from the known position of the last lock. Tracking can proceed once a reorientation of the locator along the new direction has occurred, and the user has reselected a new hyperbola apex as indicating the line of interest.

To introduce the mathematical formulation of the sensor fusion problem for the combined EM and GPR locator, a position estimation problem of a "loosely coupled" fusion of inertial and electromagnetic sensor data is presented.

Figure 3:
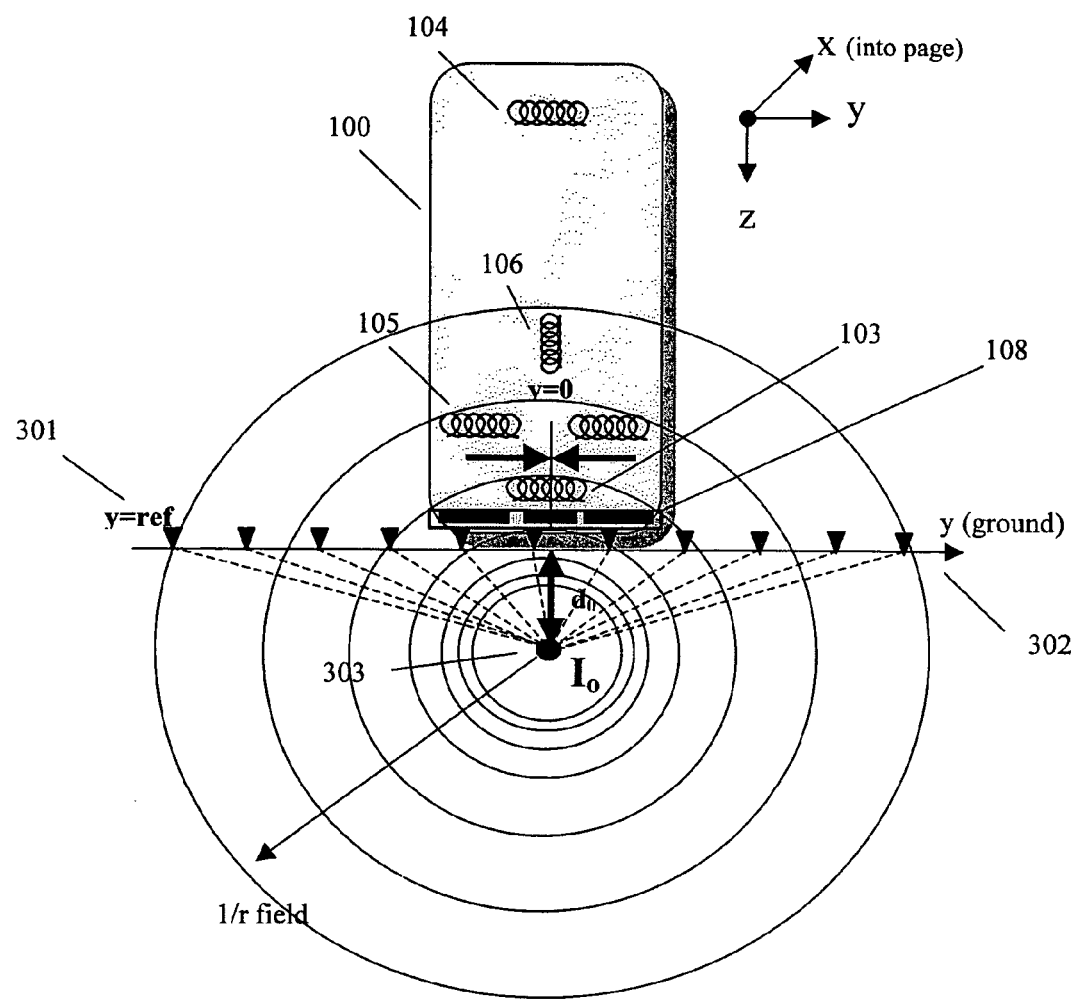
FIG. 3 illustrates the geometry of a walkover method of line location.

FIG. 3 illustrates the geometry of a "walkover" method of line location such as that described in the '696 patent application. In a loosely coupled model, measurements of both inertial and electromagnetic sensors are independently collected at intervals along the ground starting at aboveground reference position 301 and walking in the y-direction 302.

The data is then processed in a later processing step to determine a precise target conductor position 303 in a trench containing one or more conductors. As described in the '696 application, the user walks approximately perpendicular to the conductor run, measuring magnetic field, inertial, and aiding information data over the total walk. In a batch process, the inertial and aiding measurements (measurements used to correct the inertial sensor data for drift and other errors) are processed to estimate locator position versus time. In a second batch process, the position estimate is combined with magnetic field measurements from Reference 103, Null 106, and Top coils 104 to estimate conductor lateral position and depth using a non-linear optimization algorithm.

Figure 4:
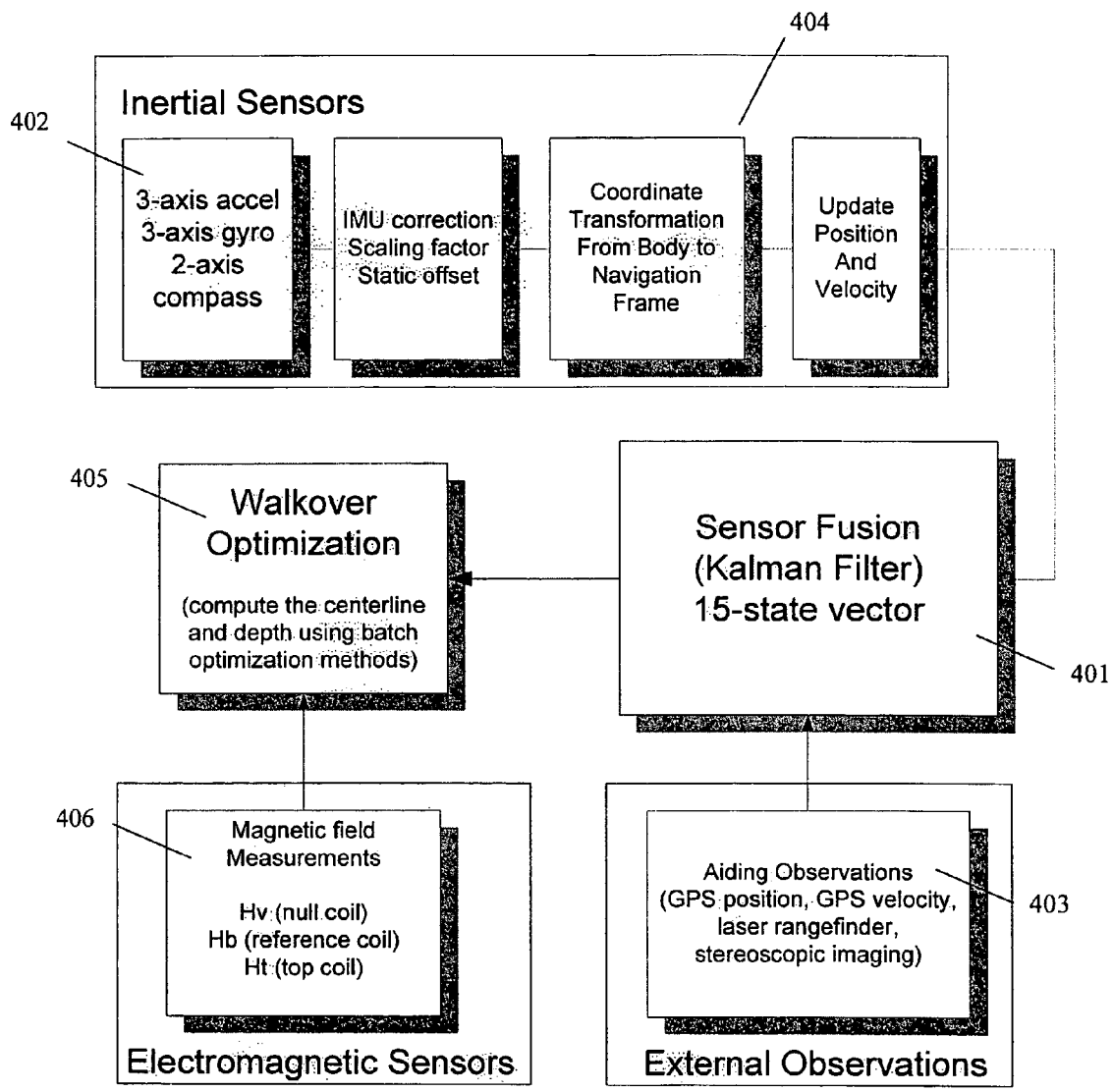
FIG. 4 illustrates a summary of the walkover process according to some embodiments of the present invention.

A depiction of the walkover process is shown in the block diagram of FIG. 4 block diagram. The locator position estimator 401 can be a linear implementation of the Kalman Filter (KF). The KF utilizes a simple kinematic model, with aid of the dynamic inertial measurements using supplementary position and velocity information. The motion dynamics are assumed to be relatively low frequency, with little vertical or transverse motion, and small angular deflections from vertical. The sensor fusion scenario is termed loosely coupled because the system that creates the position vector is separate from the optimization process that fuses the positions with the measured magnetic field values 406 from a set of electromagnetic coils.

Figure 5:
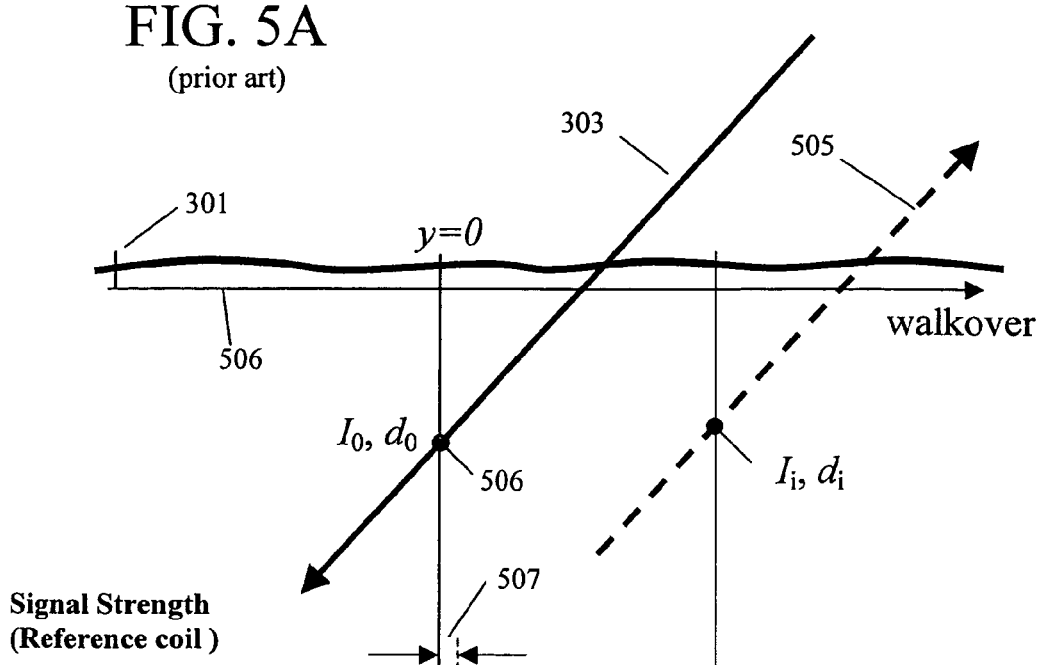
FIG. 5A illustrates the coordinate system of a walkover process according to some embodiments of the present invention.
FIG. 5B illustrates a bias in the location of the centerline of the target line illustrate in FIG. 5A.

To meet desired accuracy requirements using the non-linear walkover optimizer 405, in some embodiments position can be measured along a straight line relative to the start point with an accuracy of ±5 cm. During the walkover in the preferred embodiment, data is collected from a MEMS-based Inertial Measurement Unit (IMU) 402, which may include a tri-axial accelerometer, tri-axial gyroscope, and 2-axis magnetometer that senses the Earth's magnetic field. Other IMU types can provide similar data in which the result will be position and/or velocity. For example, a tri-axial magnetometer can be substituted for the gyroscope in order to provide attitude information that uses the stationary earth magnetic field as a reference. An observation system 403 can be used to aid the inertial measurements and is composed of any of a GPS receiver, or rangefinders (using laser, sonar, or airborne radar methods). A stereoscopic ranging system can be used to provide these aids as well. The measurements are mechanized 404 through coordinate transformation from body to inertial frame, integrated to calculate position and attitude, and combined using a Kalman filter 401 using methods well known in the navigation community. The accelerometer and gyroscope are sampled devices with a sampling rate of typically 28 Hz, more than high enough to cover the system dynamics during the walkover of about 10 Hz. To initialize the system and allow the biases to converge, the user may need to hold the locator stationary for a few seconds at the beginning of the walkover FIG. 5A shows the coordinate system, along with a target conductor 303 and another conductor 505 that creates distortion in the field measured along the walkover 506 that originates at arbitrary aboveground location 301. When a user is holding locator 100 in the normal position for the walkover, the y axis is defined as the direction transverse to the target utility line 303, the x axis is defined as parallel to the target line, and the z axis is defined as straight down. This coordinate system corresponds to a normal right-handed coordinate system. The right hand positive rotations about each axis are defined as p, q, and r ("roll", "pitch", and "yaw"), respectively. The angles subtended by these rotations about the x, y, and z axes are traditionally known as $\phi$, $\theta$, and $\psi$, respectively.

FIG. 5B shows how a bias 507 can exist in the detected centerline, as evidenced by the magnitude 508, creating an offset from actual position y=0. The algorithm disclosed in the '696 application shows how the inphase 510 and quadrature 509 signals, from reference coils 103, top coils 104, and null coils 106 can be utilized to negate this bias and predict the true centerline. Loosely coupled fusion of the inertial sensors (resulting in position estimates throughout the walkover), and magnetic coils (measuring the inphase and quadrature field strengths, for each of three coils), makes possible a self contained measurement and processing system, within the locator itself.

The model used in sensor fusion 401 (which may in some embodiments include a Kalman filter) is that the position of locator 100 is related to the measurements by the laws of motion. The tri-axial position, velocity, and attitude are maintained as states (the navigation states). Additionally, the biases of the accelerometer and gyroscope sensors can be maintained as states (the bias states). The forcing function input consists of three measured accelerations and three measured angular increments. The measured quantities contain additive sensor bias terms, so that any measured quantity is equal to the true quantity m plus the bias term $b_m$.

Note that tilt will cause the x and y axes of the accelerometer to sense the Earth's gravitation field G with magnitude given by $[\ddot{x}\ \ddot{y}]^T = G[-\sin(q)\ \sin(p)]^T$ where the notation $\ddot{x}$ represents the second derivative of the position x with respect to time, the notation $\ddot{y}$ represents the second derivative of the position y with respect to time, and the superscript T indicates the transpose of the matrix defined in the brackets. For small angles, $\sin(\theta) \approx \theta$, so $-Gq$ and $Gp$ can be used for the effect of tilt on the accelerometer signal. For each axis, the relationship between the states and the inputs is given by the following three equations that update the navigation states:

$$x_{k+1} = x_k + \dot{x}_k dt - b_{\ddot{x}_k}\left(\frac{dt^2}{2}\right) + \ddot{x}_k\left(\frac{dt^2}{2}\right) + Gq_k\left(\frac{dt^2}{2}\right) - Gb_{\Delta q_k}\left(\frac{dt^2}{2}\right) + G\Delta q_k\left(\frac{dt^2}{2}\right) \quad (1)$$

$$\dot{x}_{k+1} = \dot{x}_k - b_{\ddot{x}_k} dt + \ddot{x}_k dt + Gq_k dt - Gb_{\Delta q_k} dt + G\Delta q_k dt \quad (2)$$

$$p_{k+1} = p_k - b_{\Delta p_k} + \Delta p_k \quad (3)$$

In equations 1, 2, and 3, the notation $\dot{x}$ denotes the first derivative of the position x with respect to time (or the velocity in the x direction), dt indicates the time difference between the kth state and the (k+1)st state, $\Delta p$, $\Delta q$, and $\Delta r$ are the angular increments about the x, y, and z axes, and the various $b_m$ terms are the sensor biases.

Note that the position and velocity equations given here are for the x-axis. The y-axis angular terms have reversed sign. The z-axis does not have any angular terms. The equations for q and r are identical to the equation for p. The bias states are calculated by the Kalman observation update. All three angles of the gyroscope cube are corrected by the accelerometer output as well as the digital compass measurement. The accelerometers are used as tilt sensors, to estimate biases in the gyro channels.

The system is mathematically described using the well-known state-space terminology X=AX+BU and Y=CX, where X is the state vector, A is the state transition matrix, B is the input mapping matrix, U is the forcing function vector, Y is the observation vector, and C is the observation mapping matrix. The state vector X, then, can be defined as $$X = [x\ y\ z\ \dot{x}\ \dot{y}\ \dot{z}\ p\ q\ r\ b_x\ b_y\ b_z\ b_{\Delta p}\ b_{\Delta q}\ b_{\Delta r}\ v_{\Delta r}]^T \quad (4)$$

The input vector U can be defined as $$U = [\ddot{x} + b_{\ddot{x}}\ \ddot{y} + b_{\ddot{y}}\ \ddot{z} + b_{\ddot{z}}\ \Delta p + b_{\Delta p}\ \Delta q + b_{\Delta q}\ \Delta r + b_{\Delta r}]^t \quad (5)$$

The state transition matrix A can be defined as $$A = \begin{bmatrix} 1 & 0 & 0 & dt & 0 & 0 & 0 & G\frac{dt^2}{2} & 0 & -\frac{dt^2}{2} & 0 & 0 & 0 & -G\frac{dt^2}{2} & 0 \\ 0 & 1 & 0 & 0 & dt & 0 & -G\frac{dt^2}{2} & 0 & 0 & 0 & \frac{dt^2}{2} & 0 & G\frac{dt^2}{2} & 0 & 0 \\ 0 & 0 & 1 & 0 & 0 & dt & 0 & 0 & 0 & 0 & 0 & 0 & 0 & 0 & 0 \\ 0 & 0 & 0 & 1 & 0 & 0 & 0 & Gdt & 0 & -dt & 0 & 0 & 0 & -Gdt & 0 \\ 0 & 0 & 0 & 0 & 1 & 0 & -Gdt & 0 & 0 & 0 & -dt & 0 & Gdt & 0 & 0 \\ 0 & 0 & 0 & 0 & 0 & 1 & 0 & 0 & 0 & 0 & 0 & -dt & 0 & 0 & 0 \\ 0 & 0 & 0 & 0 & 0 & 0 & 1 & 0 & 0 & 0 & 0 & 0 & -1 & 0 & 0 \\ 0 & 0 & 0 & 0 & 0 & 0 & 0 & 1 & 0 & 0 & 0 & 0 & 0 & -1 & 0 \\ 0 & 0 & 0 & 0 & 0 & 0 & 0 & 0 & 1 & 0 & 0 & 0 & 0 & 0 & -1 \\ 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 0 & 1 \end{bmatrix} \quad (6)$$

The state transition matrix implements the state vector terms of EQN. 1 in the top three rows, EQN. 2 in the next three rows, and EQN. 3 in the next three rows. The bottom six rows simply propagate the biases. The bias states are only changed by the Kalman observation update.

The input mapping matrix B can be defined as $$B = \begin{bmatrix} \frac{dt^2}{2} & 0 & 0 & 0 & G\frac{dt^2}{2} & 0 \\ 0 & \frac{dt^2}{2} & 0 & -G\frac{dt^2}{2} & 0 & 0 \\ 0 & 0 & \frac{dt^2}{2} & 0 & 0 & 0 \\ dt & 0 & 0 & 0 & Gdt & 0 \\ 0 & dt & 0 & -Gdt & 0 & 0 \\ 0 & 0 & dt & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} \quad (7)$$

The IMU input terms of EQNS. 1-3 are implemented in the top nine rows, and the last six rows leave the biases unchanged.

At each time step k, the state vector is propagated by the equation $$X = AX + BU \quad (8)$$

Since the time step integration in this simple case is being modeled as a simple summation, EQN. 8 is a simplification. A more sophisticated implementation of the Kalman Filter uses a slightly different form of the state transition matrix such that equation 8 calculates the first derivative of the state vector $\dot{X} = AX + BU$. Then, any of the well-known numerical integration techniques such as Simpson's Rule or the Trapezoid rule can be used to calculate the state vector X. Additionally, a process noise matrix P, which gives the variance of each state at each time step, can be defined. The process noise matrix is propagated by the equation, $$P = APA^T + Q \quad (9)$$

where Q gives the variance of each input. The variances are calculated by characterizing the sensors.

After a set of measurements is collected in inertial sensors 402, the state vector is initialized. The accelerometer and gyroscope measurements from the first three seconds are averaged, and their standard deviations are calculated. In the state vector X, the positions and velocities can be initialized to 0. The p and q (roll and pitch) attitude angles are initialized by assuming the averaged accelerations are bias free and that the measured accelerations are due to tilt. The r attitude angle is initialized with the average compass value, and the biases are initialized with the averaged values. The Q matrix is assumed to be diagonal (that is, the cross-variance terms are assumed to be 0). The position and velocity standard deviations are calculated by multiplying by $\sqrt{dt}$ for each integration [Bevly, David M., "GPS: A Low Cost Velocity Sensor for Correcting Inertial Sensor Errors on Ground Vehicles", *J. of Dynamic Systems, Measurement, and Control*, June 2004, Vol. 126, pp. 255-264], which is herein incorporated by reference in its entirety. The bias variances are observed to be much smaller than the quantity variances, so are initialized by dividing the calculated standard deviations by $\sqrt{10}$. The calculated standard deviations are then squared to find the variances.

The Kalman Filter is used to introduce observations into the prediction process to eliminate drift errors that accumulate in the absence of such corrections. Normally the interval between successive observations is longer than the measurement sampling interval, but during initialization, while the system is converging, the interval might be the same. In some embodiments of the present invention, there are three possible observations: zero-velocity (the locator is known to be at rest), GPS velocity, or laser rangefinder. During the stationary period at the beginning of a locate session, measurement data can be acquired at every time interval, the state vector is propagated and a Kalman observation update based on aided observations 403 can be applied. The observation can consist of position, velocity, or attitude, or any combination of the three. Position and velocity are set to zero, and attitude is set to the angles that correspond to the current acceleration. Once the stationary period is over, the system will apply (when available) either a GPS velocity or laser rangefinder observation, or both to correct the state estimates that are derived from the inertial subsystem. At each state estimation interval, the system checks the array of observations and sees if an observation was recorded in the next sample period. If an observation was recorded, the system replaces all the dt terms in the A and B matrices with the time between the current sample and the observation, propagates the state vector and P matrix, applies the Kalman observation update, and completes the time step integration. The Kalman observation update calculates the Kalman gain matrix K, and then uses K to update the state vector and the variance matrix. Subtracting the observed values from the predicted values, and multiplying the resulting error vector by K, updates the state vector. The Kalman update equations are, then, given by:

$$K = PC^T(CPC^T + R)^{-1} \quad (10)$$

$$X = X + K(Obs - CX) \quad (11)$$

$$P = (I_{NumStates} - KC)P \quad (12)$$

The C matrix defines the mapping of the state vector to the observation. Since our observations are all individual states, the C matrix simply has as many rows as there are observations, as many columns as there are states, and 1's where the states are observed and 0's otherwise. The R matrix, which specifies the variances of the GPS observation quantities, can use standard deviation values of about 0.1 m position, about 0.03 m/s velocity, and about 1° attitude, for observation update intervals on the order of one per second. (When the observation comes from a laser rangefinder, the standard deviation can be changed to about 0.015 m, but the observation interval may have occasional larger gaps corresponding to when the laser beam is off-target.) Clearly, the laser rangefinder is the preferred observation method because it provides the most reliable aiding information to the INS.

The GPS standard deviation values are justifiable for typical consumer grade (single frequency) GPS systems over short timeframes on the order of 30 seconds or less, as is the case for the walkover operation. To achieve this accuracy, certain controllable assumptions have to be made, for example: the stationarity of tropospheric perturbations over that timeframe, the set of satellites used in the solution remains the same throughout the walkover, multi-path reflections are low or fixed, and the signal-to-noise for each satellite is adequate. These and other assumptions are viewed as implementation details, since they are easily overcome with present technology using differential GPS, and/or multi-frequency GPS systems. But even consumer grade GPS systems provide useful position observations when the assumptions are valid. Alternatively, the observed GPS velocities can be used to aid the inertial system. Often, low-cost GPS receivers provide very accurate velocity measurements, since the phase of each GPS satellite signal can be tracked via a phase-locked loop, and the change in phase is related directly to the velocity of the moving GPS antenna.

In embodiments of the present invention, GPS is not used to provide absolute position or velocity fixes, only relative point-to-point measurements that are taken to be on a straight-line path from (or to) an aboveground reference point. Someday, the accuracy of GPS will be good enough to absolutely provide position estimates such that a stationary aboveground reference point isn't necessary, but the positioning methods described here do not depend on this.

Figure 6:
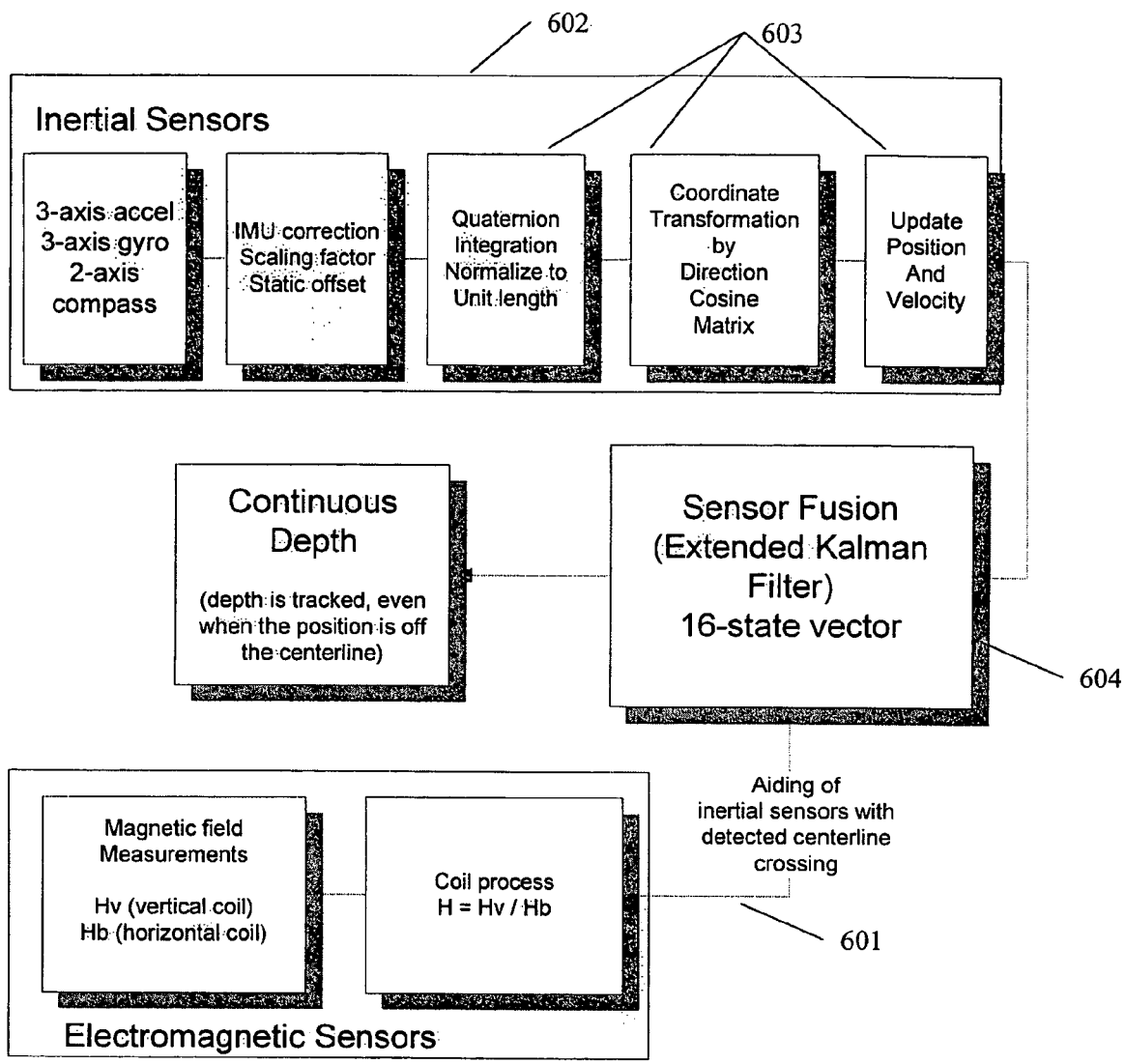
FIG. 6 illustrates a tightly coupled sensor fusion system according to some embodiments of the present invention.

FIG. 6 illustrates a "tightly coupled" sensor fusion according to some embodiments of the present invention. In the "tightly coupled" sensor fusion of inertial and EM sensors shown in FIG. 6 (specifically, the Kalman Filter 604), electromagnetic coil measurements on the locator are used to provide aiding observations 601 to the inertial system 602 through mechanization equations 603. This enables more complex motion tracking, as well as tighter control of the measurement results. The main benefit of operation in this mode is that the target conductor depth can be measured continuously. Further, external observations 128 are not necessary for accurage determination of the state variables.

While tracing the centerline of the underground target conductor, the user swings the locator at arm's length in an arc roughly perpendicular to the targeted conductor, while walking in the path of that conductor. The x-axis is defined as straight ahead in the direction of the target line, the y-axis is defined as to the right, and the z-axis is defined as straight down into the ground. As before, the right hand positive angular velocities about each axis are defined as p, q, and r, respectively.

A graphical element 203 (FIG. 2B) can be shown on display 101 indicating in what direction the targeted underground line, relative to the position of locator 101 aboveground. This is known as the Left/Right guidance function and can be derived from either a pair of horizontally opposed coils 105, or a "Null" coil 106. The locate technician monitors the Left/Right guidance display to determine the estimated position of the cable.

From FIG. 3 it can be seen that at the centerline of an ideal field the difference between the Left/Right (L/R) coils is zero when there is only a single radiating conductor underground. The L/R and Null coils provide very similar output and certain locator implementations will include one or the other, but usually not both. However, both will be included in the sensor fusion discussion below.

In addition to the L/R and Null coils, locator 100 can include the Top 104 and Reference 103 coils. These coils measure the horizontal component of the field at two vertically offset positions and therefore can be used to calculate the target conductor depth, using the simple one-conductor field model such as that described in U.S. Pat. No. 6,815,953.

At each time step, the electromagnetic coils simultaneously measure the field in two dimensions y and z. Assuming an ideal single radiating conductor, the equations governing the horizontal projection of the off-axis magnetic field strength at ground level in they and z dimensions are presented in EQN. 13 for the Reference coil 103, EQN. 14 for the L/R coil pair 105, EQN. 15 for the Null coil 106, and EQN. 16 for the Top coil 104. The centerline of the target line is taken as y=0.

$$h_b = \frac{Id}{y^2 + d^2} \quad (13)$$

$$h_d = \frac{Id}{\left(y - \frac{\eta}{2}\right)^2 + d^2} - \frac{Id}{\left(y + \frac{\eta}{2}\right)^2 + d^2} \quad (14)$$

$$h_v = \frac{Iy}{y^2 + d^2} \quad (15)$$

$$h_t = \frac{Id}{y^2 + (d+\zeta)^2} \quad (16)$$

where:

| | |
|---|---|
| Distance between Left and Right coils 105 | $\eta$ |
| Distance between Reference and Top coils 103 and 104, respectively | $\zeta$ |
| Primary current in the target cable | I |
| Depth of the target cable 110 | d |
| Horizontal component of magnetic field at bottom Reference coil 103 | $h_b$ |
| Difference component of magnetic field signal after Left – Right subtraction | $h_d$ |
| Vertical component of magnetic field at Null coil 106 | $h_v$ |
| Horizontal component of magnetic field at Top coil 104 | $h_t$ |

At the centerline (y=0), assuming the same single conductor model, the depth of the conductor can be determined from EQN. 17, using measured magnetic field strengths from the top and bottom coils:

$$d = \frac{\zeta h_t}{(h_b - h_t)} \quad (17)$$

Because of filter settling times in narrow bandwidth locating systems, the typical depth measurement scenario usually requires the user to bring the system to rest and to press a button to initiate the depth measurement. It is preferable to create an accurate depth output at more frequent intervals. So, some embodiments of the fusion of inertial and electromagnetic sensors (in a tightly coupled sense) compute an estimate of the locator position and attitude at all times from the inertial subsystem, use observations from the magnetic field measurements to correct imprecision in these measurements, and then with the updated measurements of position and attitude, compute a continuous depth output per EQN. 13. The foregoing method allows accurate depth measurements to be achieved without reliance on centering locator 100 over the centerline.

To achieve this using the sensor fusion model, a change to the state vector is required to accommodate the larger dynamics of the common L/R swinging operation of the locator. The small angle approximations used in the loosely coupled scenario may not apply. Furthermore, all three Euler rotation velocities p, q, and r may see substantial changes. Following several examples in the navigational systems literature (the system model used in the GNU Autopilot project http://sourceforge.net/projects/autopilot/ represents a close approximation to what is needed in this application), a more robust dynamics model can be used to track the off-centerline position of the locate receiver.

The 16-state vector X is similar to the loosely coupled case, but the Euler angular velocities p, q, and r (representing the rate of change of the locator attitude in three-space) are replaced by four quaternion states q0, q1, q2, q3:

$$X=[xyz\dot{x}\dot{y}\dot{z}q0q1q2q3b_xb_yb_zb_{Ap}b_{Aq}b_{Ar}]^T \quad (18)$$

Quaternions are a mathematical transformation of 3-dimensional attitude into a framework that uses four variables q0, q1, q2, q3. The main advantage of the quaternion representation is that singularities, that can exist when the Euler angles are represented using trigonometry, do not appear. An excellent introductory discussion on quaternions is found in a Master's Thesis by Sven Rönnbäck, "Development of an INS/GPS navigation loop for a UAV", Lulea University of Technology, Department of Computer Science and Electrical Engineering, which is herein incorporated by reference in its entirety. The Direction Cosine Matrix (DCM) transforms the Euler angles to and from the quaternion frame, when such transformations are required.

To compute continuous depth at any position (not just the centerline position), the position states x, y, z and the attitudes p, q, r are the relevant parameters that describe the off-centerline position of the locate receiver. The x, y, and z reference is the local navigation frame, which is referenced to the centerline position of the tracked utility. But other states exist in the state vector to facilitate correction by sensor bias, and to input specific observations into the filtering process. The $\dot{x}$, $\dot{y}$, and $\dot{z}$ are the body (in this case, locator 100) velocities, and the accelerometer and gyroscope biases are as discussed above. To accommodate the more flexible dynamics allowed by use of the quaternion representation, the state transition matrix A increases by one more row and column. As now the dynamics of the plant include the four quaternion states, the input vector (EQN. 5) remains unchanged.

Matrix A represents all the partial derivatives of the state vector. For the Kalman Filter to properly propagate the states, the state transitions must be linearized around the current values. Because of the quaternion representation, each time step requires a computation of the Jacobian of the state propagation function with respect to the states. Portions of the matrix are derivatives taken with respect to the four quaternion angles. The full state mechanization equations may be found, for example, in (Svenback). The process is the same as described in EQNs. 8-12, but complemented by a normalization of the state vector by the current quaternion states, and an update to the A matrix on each time step as required to compute the new partial derivatives.

For the current inertial and electromagnetic sensor fusion problem, in a tightly coupled sense, an accurate state vector can be derived, from which the target conductor depth d can be constantly (on every time step) updated. The traditional method (EQN. 17) for depth calculation requires the locator to be positioned at the centerline, and further to utilize a difference measurement between two vertically displaced coils. The most accurate way to verify that the locator is positioned on the centerline is by examining the Null and/or L/R coil signals. When these signals are at or close to zero, and then the user presses a button to compute the depth.

This traditional L/R or Null centerline observation guides us in the continuous depth (by sensor fusion) case as well, in that either of these two signals can be used as an observation update to the Kalman filtering process set up in the last paragraphs. When the centerline is crossed, it is known that, approximately:

$$\begin{aligned} y &= 0 \\ z &= z_l \\ \dot{y} &= p^* r_{arm} \\ \dot{z} &= 0 \end{aligned} \quad (19)$$

where:
Lowest vertical position of Reference coil in the swing (distance above ground level) $\quad z_l$
Radius of the swing arm, including the body of the locator itself $\quad r_{arm}$ z=0 is defined as the ground level, and with a small offset $z_l$ this is a good approximation for the low point of the locator as it swings between moving from left or right of center. The swing radius relates to the geometry of the locator body and can be treated as a design constant.

The centerline crossing (detected from the L/R or Null signals) results in a new state estimate when information from EQN. 19 is used as observations for the tightly coupled fusion of inertial and electromagnetic sensors using the Kalman filter. The current in the line is estimated from the simple relation, $I=h_b d$. Since the pitch angle is $\theta=\int qdt$, and the yaw angle is $\psi=\int rdt$, and both can be easily computed from the state vector X (EQN. 18), then (for a system with a null coil):

$$d = \sqrt{\frac{Iy - h_v y^2}{h_b \cos\theta \cos\psi}} - z \quad (20)$$

where in this case z is the instantaneous elevation of the swinging locator above ground level.

Thus continuous depth measurements are achieved without any external aiding sensors (like GPS or rangefinders). Since the coordinate system is with reference to the target cable centerline, no need exists to tie the continuous depth measurement to a fixed reference point. Furthermore, an accurate continuous depth measurement is achieved without the use of a vertically offset top coil. No use of the value $h_t$ (EQN. 16) has been made, so that some embodiments implementing the continuous depth method described herein do not need to employ a top coil at all.

It should be noted that the x-direction in the model is uncorrected by observations in the discussion above. Using external aiding methods (once again, like GPS or rangefinders) in the forward direction (in line with the target utility), can provide an Earth fixed reference frame for the forward direction. The model above does not change; only observations are made on a time schedule that may be different than the rate of centerline crossings.

Figure 7:
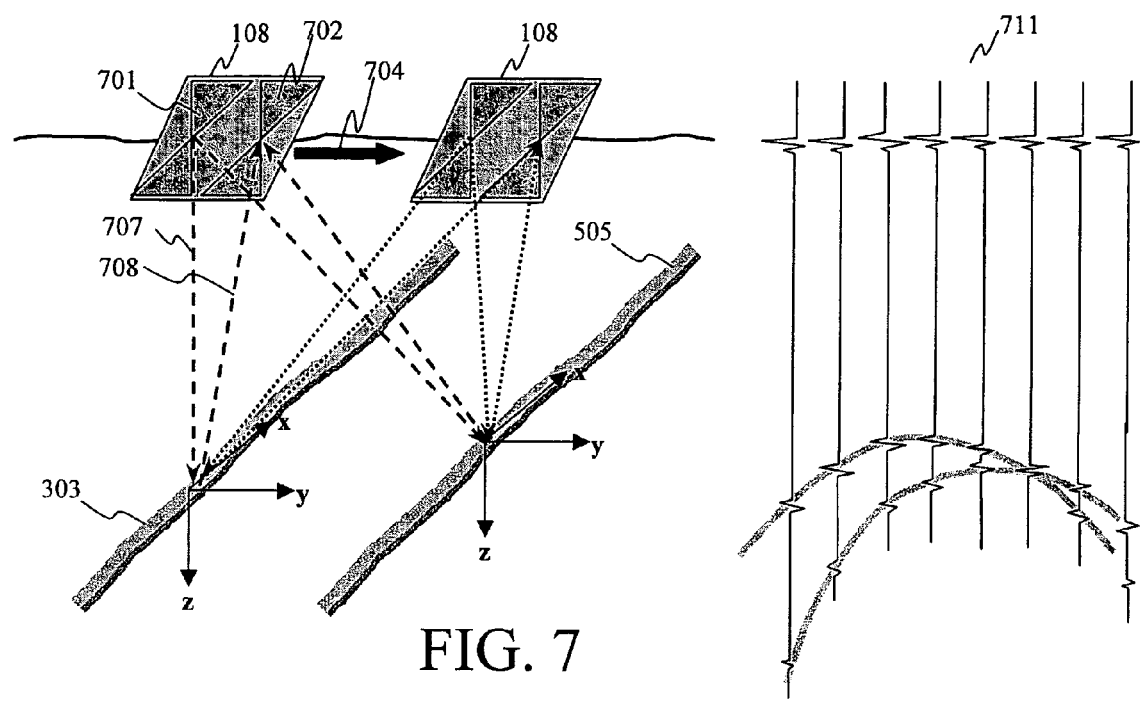
FIG. 7 illustrates the geometry utilized in a GPR antenna assembly locating an underground line.

In the "tightly coupled" sensor fusion of inertial and GPR sensors, a 2-way travel time detector of the radar pulse replaces the magnetic field strength coils which were used in the EM locating mode. FIG. 7 illustrates the geometry of a radar antenna assembly used for underground utility location. In the present invention, a succession of radar pings are transmitted as the handheld GPR system is moved left-to-right over the centerline of a target cable. The operation is better characterized as "skimming" the antenna assembly over the ground, rather than swinging, allowing a more efficient coupling of radar energy into the ground. As dipole antenna assembly 108 is moved across the ground in the direction of path 704, one of the "bowtie" antennas 701 or 702 is used to transmit signals, and the other to receive reflected signals. As shown in FIG. 7, transmit beam 707 is reflected from line 303 into reflected beam 708. Utility lines 303 and 505 represent discontinuities in the dielectric constant of the soil medium, thus reflections occur and the lines can be discriminated from the background. Sequence of traces 711 represent an example of the radar return from utility lines 303, 505 as the locator is moved transversely from left to right 704 over the top of the lines. By viewing the entire sequence, the presence of an underground object can be deduced. The aggregate image often takes the form of the series of overlapping hyperbolas seen in 711. It can also be observed that a threshold operation on any one of the radar echo returns shown in 711 can result in a measure of the 2-way travel time from transmit antenna to utility line, and back.

Figure 8:
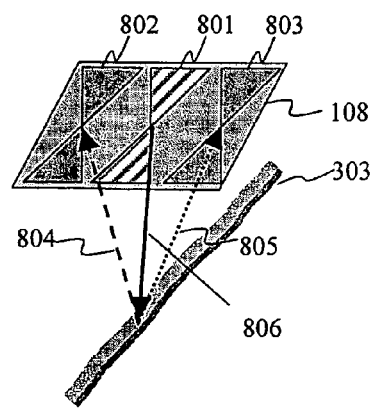
FIG. 8 illustrates an embodiment of the present invention where the GPR antenna includes three bowtie antennas.

FIG. 8 shows the addition of a third antenna 801 to assembly 108 to enhance the ability of the system to detect whether it is to the left or to the right of the underground utility line. This center transmit antenna 801 couples a radar pulse 806 into the ground and two receive bowtie antennas 802, 803 receive reflected signals 804, 805. Using this arrangement, a travel time difference can be measured, allowing a stateless measurement of the left/right position over the line. The sensor fusion methods described herein (and therefore embodiments of the present invention) do not require two receive GPR antennas, but the mathematical treatment is simplified by this arrangement. A generalized numerical approach is discussed that does not require such a simplification is further disclosed below.

It is also possible that a GPR system according to some embodiments of the present invention may have the ability to transmit and receive on the same bowtie antenna. If this is the case, than a travel time difference signal can be calculated by transmitting on the first antenna and receiving on the second, simultaneously with receiving the signal on the first antenna, which operates in a multiplexed mode. Other embodiments are possible to derive a travel time difference signal, by adding additional antenna elements in known geometrical patterns, so that trigonometric identities can be used to determine the travel time differences.

For one embodiment of the GPR locator subsystem used in the following mathematical development, two separate bowtie receive antennas 802 and 803 separated by a known distance are mounted aside a third antenna 801 that transmits, as in FIG. 8. Then, we can define the functions:

$$d = \sqrt{v^2 t^2 - y^2} \tag{21}$$

$$g_d(t) = \frac{1}{t_L^2} - \frac{1}{t_R^2} = \frac{v^2}{\left(y - \frac{\eta}{2}\right)^2 + d^2} - \frac{v^2}{\left(y + \frac{\eta}{2}\right)^2 + d^2} \tag{22}$$

$$g_s(t) = \frac{1}{t_L^2} + \frac{1}{t_R^2} = \frac{v^2}{\left(y - \frac{\eta}{2}\right)^2 + d^2} + \frac{v^2}{\left(y + \frac{\eta}{2}\right)^2 + d^2} \tag{23}$$

where:

| | |
|---|---|
| Measured 1-way travel time of radar ping from Left/Right antennas 802 and 803 | $t_L, t_R$ |
| Function related to the difference in 1-way travel time to the two receive antennas 802 and 803 | $g_d$ |
| Function related to the sum of 1-way travel times to the two receive antennas 802 and 803 | $g_s$ |
| Radar signal velocity | v |
| Separation between two receive antennas | η |

The function $g_d$, related to the differential time difference of a radar return coincident on two closely spaced radar antennas 802 and 803, is a convenient parameter that can be utilized to derive a Left/Right signal that indicates the target cable centerline in the GPR locate mode. However, a single bowtie receive antenna can be used in a peak mode to determine the centerline as well. This is analogous to simple peak-mode EM locators that employ a single antenna. A quantity $$g(t) = \frac{1}{t^2} = \frac{v^2}{y^2 + d^2}, \tag{24}$$

for example, can be utilized to derive a peak function for the GPR locator, and bar graph 204 can be driven with this value. If this were the case, a Left/Right signal can also be derived by holding the last peak value of g(t) and maintaining state information as to whether the current position is to the left or to the right of the peak. But in some embodiments using a stateless Left/Right signal, at least two radar receive antennas are present, and EQN. 22 provides the information needed to generate a Left/Right display.

Generally it is not difficult to find a mix of metallic and non-metallic lines at any test site, so an initial estimate of the radar signal velocity v can be obtained using the EM locator's independent depth measurement when the target of both EM and GPR systems is a metallic line. The round trip travel time to and from the underground line depends on v, which in turn depends on the local soil conditions (in particular the dielectric constant of the soil). At a detected centerline (when the travel time is at a minimum, the depth is related to the (one-way) travel time t by the simple relation d=v/t. The depth d of a metallic conductor (seen by both EM and GPR systems) is determined by the EM locator using EQN. 17, and then v can be treated as constant at the test site for other GPR line locates, including non-conducting lines. (The assumption of constant radar velocity v at the locate site can be dropped for ultra-tightly coupled GPR/inertial system embodiment.)

A continuous depth measurement can be calculated utilizing the same 16-state vector applies as that shown in EQN. 18. When the measured function $g_d(t)$ is zero, the antenna assembly is at the centerline. Clearly, the larger the separation distance, the more reliable are the centerline position estimates. Values of η in the range of about 10 cm allow enough precision in the signal function $g_d$, up to depths of about 1 m. The EQN. 19 observations are the same, since this portable, handheld GPR system is moved over the ground in a skimming motion, but to ensure good coupling of the radar signal into the ground, the lower antenna is kept mostly level and close to the ground. Identically to the EM tightly coupled case, the state of the off-centerline distance y can be updated through the Kalman filtering process, and EQN. 21 used to calculate the continuous depth for the GPR line locating mode (assuming constant v).

Figure 9:
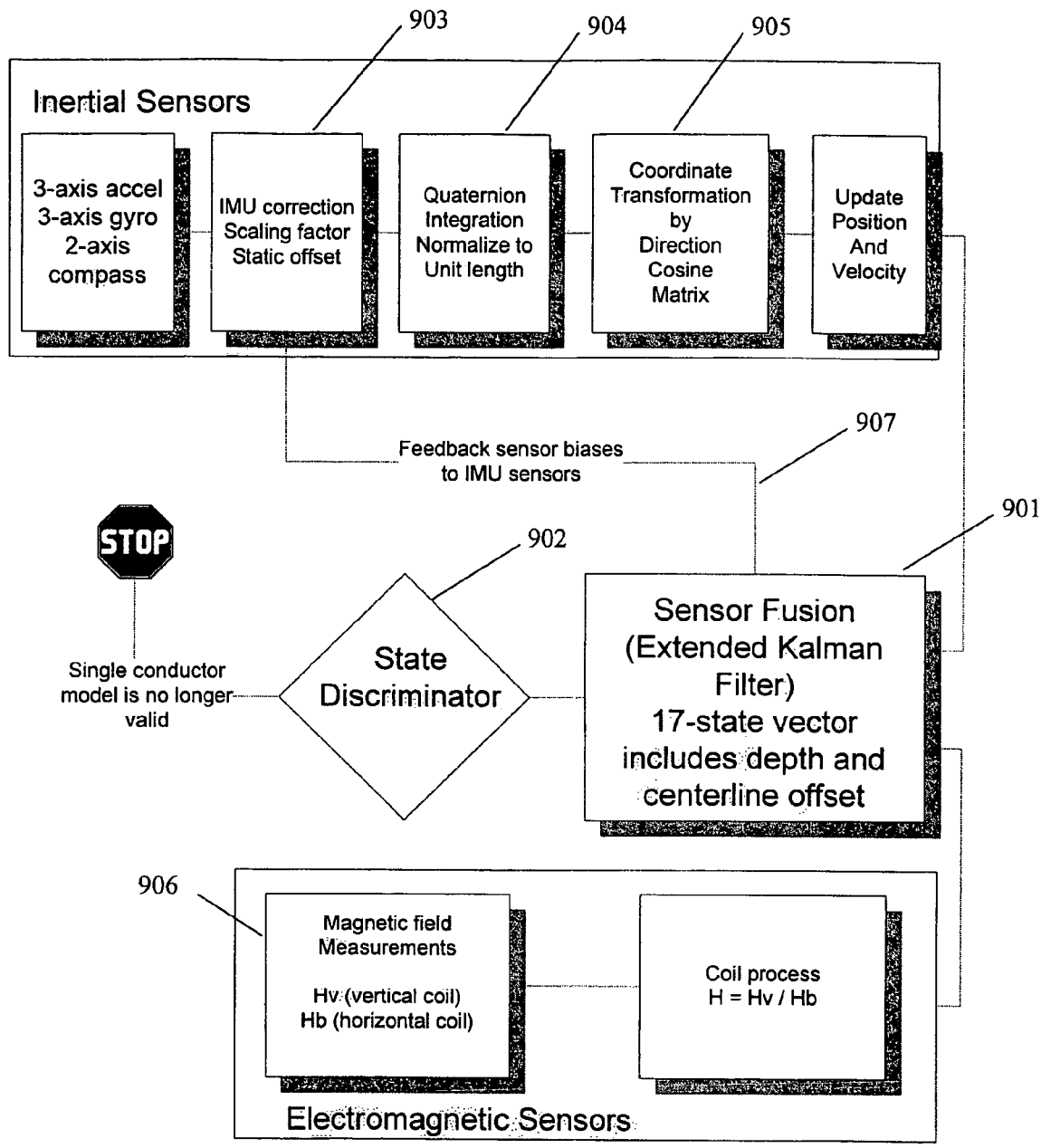
FIG. 9 illustrates an embodiment of the present invention in an ultra-tightly coupled sensor fusion model.

The third sensor fusion scenario (for the EM locator mode, as shown in FIG. 9) is termed the "ultra-tightly coupled" case, distinguished as such because the electromagnetic field parameters appear as states in the state vector utilized in the fusion process. The benefits of this embodiment are that the state vector can be updated more often than once per centerline crossing (as often as every propagation time step is possible), allowing more accuracy in the joint prediction of the inertial and magnetic field sensor states.

The motivation for this improved accuracy goes beyond providing a continuous depth measurement to the user. As discussed in the '696 patent application, if bleedover or bleedoff is present at the locate site, signal distortion can greatly affect the precision of the centerline and depth estimates that are based on a single conductor model of the underground plant. When there is more than one underground cable radiating the transmitted signal, as can occur when cables are buried in close proximity, the field models (EQNs. 13-16) can result in very biased estimates of the true field. FIG. 5B shows what those signals may look like when there are two such conductors. Notice that the centerline 507 (as determined from the Null or L/R coils) is offset from the true centerline, and further note that the magnitude of the Reference coil measurement 508 (composed on inphase 510 and quadrature 509 components per the disclosure of the '696 application) varies from what would be obtained using a single conductor model. Thus a depth calculation based on these signals using EQN. 17 will also be biased.

Some embodiments of the full, ultra-tightly coupled sensor fusion model (for EM and inertial sensor fusion) are directed at the problem of detecting when the simple one-conductor model does not apply. The outcome of such a system is a simple flag to alert the user to stop tracking by the "L/R swinging" method, and switch the locator to a "Precise Locating" mode that employs the walkover optimization methods describe in the '696 patent application, and supplemented by the position estimation methods described in the loosely coupled scenario above.

Before the state-space dynamics model is enhanced once more, a transformation of certain electromagnetic coil signals is performed. L/R signal $h_d$, or Null signal $h_v$ can both be normalized by the bottom coil signal in ways that create a linear response as a function of position (since for any particular location on a utility line being traced, the current and depth are constant). The field measurements can be normalized by defining:

$$y_d = Lld \frac{h_d}{h_b^2} \quad (25)$$

$$y_v = Md \frac{h_v}{h_b} \quad (26)$$

where $y_d$ and $y_v$ are the off-centerline state variables for the L/R coil and Null coil configurations, respectively. In this context L and M are scale factors related to locator geometry and are constant for all sites. L has dimensions of $m^{-1}$, and M is unitless.

Figure 10:
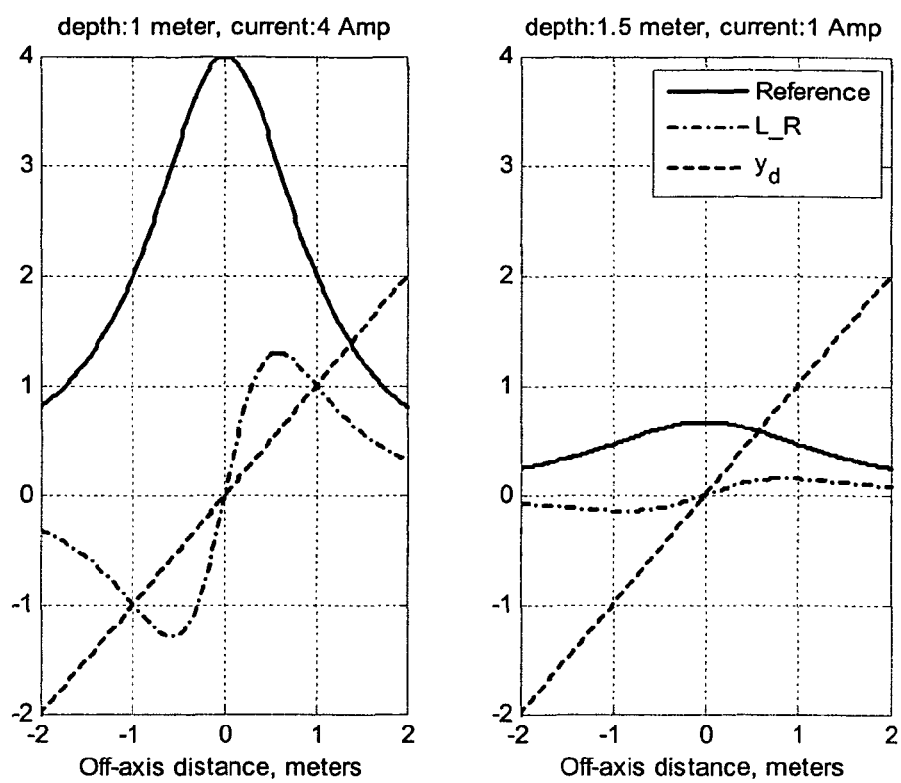
FIGS. 10-12 show computed values of y as a function of known off-centerline position.
Figure 11:
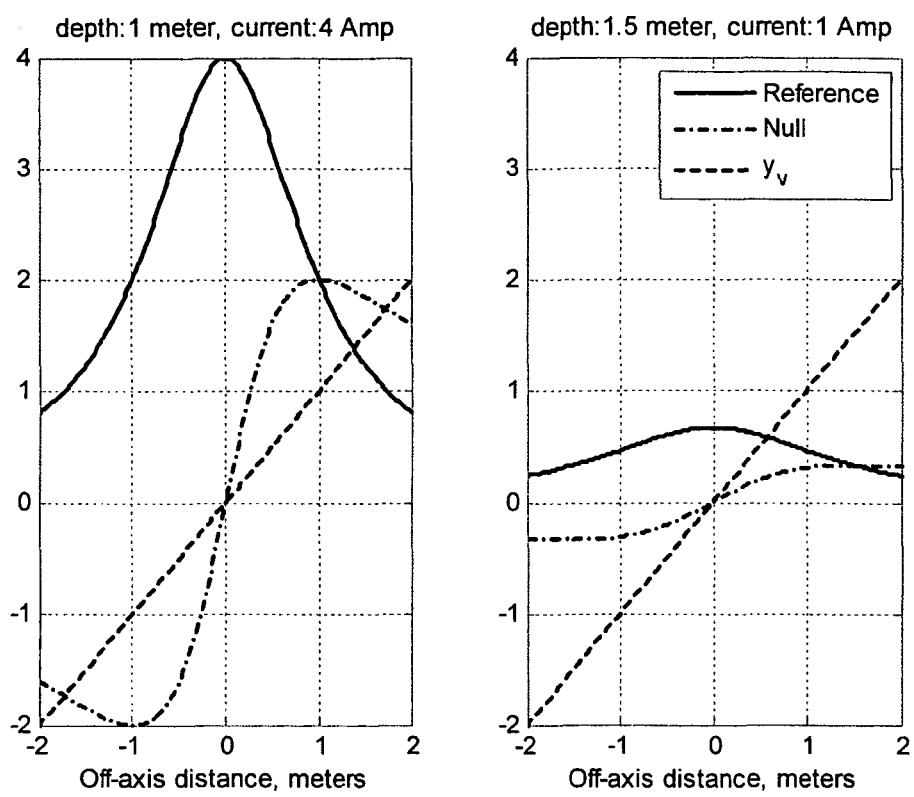

For a single-conductor model, FIGS. 10 and 11 shows computed values of $y_d$ and $y_v$, respectively, as a function of known off-axis position, for the L/R and Null coil configurations. The constants L and M are chosen such that the slope of the line ($y_d$ and $y_v$, as the case may be) is one. In each of the two plots on the left, I=4, d=1, and in the other plot on the right, I=1, d=1.5. At the centerline in both cases, d (or the product of Id, for the L/R coil configuration) is initialized by invoking a target cable depth measurement at the locate site.

The ultra-tightly coupled sensor fusion problem (as shown in FIG. 9), applied to the integration of inertial and electromagnetic sensors, utilizes a single Extended Kalman Filter (EKF) 901 to perform the fusion. The output of that filter is the input to a discriminator 902 that detects whether the ideal 1-conductor model is valid or not, based on a statistical analysis of the state vector including a check on the growth of biases. The processing can assume that the inertial sensor data 903 be corrected for bias factors, and then these quantities are used to integrate the quaternions 904. The Direction Cosine Matrix 905 is computed from the updated quaternions and transforms the state vector to the navigation frame. That allows a correction for the gravity component of acceleration, and the subsequent integration of velocity to calculate the off-centerline position of the locator.

Propagation of the Kalman filter state occurs on the measurement interval of the inertial system, and when observations are available (at the rate that the EM field data 906 is sampled), the filter 901 is updated with those observations. The navigation solutions allow the inertial parameters to be updated with corrections to the bias errors.

In the ultra-tightly coupled model, the EM sensor data becomes part of the state, so there is a feedback path 907 from the sensor fusion block to the quaternion integration block. The EM measurements 906 improve the accuracy of the inertial system bias error estimates in filter block 901, which applies a correction to the gyroscopic measurements 907, which are in turn used in the quaternion calculations 904. Thus the fusion of the sensors is at the core of the Kalman state propagation, rather than confined to the level of the observation updates, as it is for the tightly coupled case.

The discriminator function 902 monitors the state vector and variance matrix for evidence that the field measurements are not bringing the IMU measurements to convergence. This phenomenon indicates that multiple currents in multiple conductors create distortion in the measured field, rather than the one conductor model used in filter 901. The discriminator flags such cases and alerts the user that a walkover to determine the actual conductor configuration is necessary.

For embodiments of locator 100 that employ the L/R coil, the previously stated IMU system state is augmented with a field measurement state Id:

$$X = [xyz\dot{x}\dot{y}\dot{z}q_1 q_2 q_3 q_4 b_x b_y b_z b_{A_p} b_{A_q} b_{A_r} Id]^T \quad (27)$$

For embodiments of locator 100 that employ the Null coil, the previously stated IMU system state is augmented with a field measurement state d:

$$X[xyz\dot{x}\dot{y}\dot{z}q_1 q_2 q_3 q_4 b_x b_y b_z b_{A_p} b_{A_q} b_{A_r} d]^T \quad (28)$$

The input vector (EQN. 5) remains unchanged, and the state transition matrix A is augmented with one more column and row that simply propagate the field measurement state, after a quaternion normalization at each time step. The input-mapping matrix B (EQN. 7) is augmented with one more row of zeros. At each time step, the state vector is propagated by the method previously described.

A user button push operation prior to start of the line tracing initializes the field observation state vector, and with the system at rest the initial bias can be estimated.

In the previously described tightly coupled sensor fusion scenario, the observation of position occurred independently by examination of the Null or L/R signals measured by the electromagnetic coils residing on the locator. In this ultra-tightly coupled scenario, the field measurements can be utilized to predict the position using EQN. 25 or 26 (for the L/R or Null coils, respectively). This equation can be rearranged to create the observation equation (for the L/R coil), where c(u) refers to the observation function of u:

$$\frac{h_d}{h_b^2} = c(Id, y) = (LId)^{-1} y \tag{29}$$

For the Null coil case, the observation is $$\frac{h_v}{h_b} = c(d, y) = (Md)^{-1} y \tag{30}$$

These equations are non-linear, and hence an Extended Kalman Filter (EKF) is used to update the state vector at each observation point. The observation update requires calculation of the Jacobian C of the observation function c. The function c is time-invariant, however its partial derivatives are time varying. Therefore the C matrix is recalculated at each observation point by evaluating the partial derivatives with their values at that moment. The C matrix for the L/R coil is $$C = \frac{\partial c}{\partial X} \tag{31}$$
$$= \begin{bmatrix} 0 & (LId)^{-1} & 0 & 0 & 0 & 0 & 0 & 0 & 0 \\ 0 & 0 & 0 & 0 & 0 & 0 & -(LId)^{-2} y & & \end{bmatrix}$$

and for the Null coil:

$$C = \frac{\partial c}{\partial X} = [0 \ (Md)^{-1} \ 0 \ 0 \ 0 \ 0 \ 0 \ 0 \ 0 \ 0 \ 0 \ 0 \ 0 \ 0 \ -(Md)^{-2} \ y] \tag{32}$$

The Jacobian matrix C is evaluated at each observation time with the current state vector values, then used in the EKF update equations:

$$K = PC^T(CPC^T + R)^{-1} \tag{33}$$

$$X = X + K\left(\frac{h_d}{h_b^2} - c(Id, y)\right) \tag{34}$$

for the L/R coil, and $$X = X + K\left(\frac{h_v}{h_b} - c(d, y)\right) \tag{35}$$

for the Null coil. The covariance matrix update is:

$$P = (I_{NumStates} - KC)P \tag{36}$$

Note that the EKF update equations EQNS. 33-36 are identical to the KF update equations EQNs. 10-12 except C is now the Jacobian matrix, and the observation prediction is given by the non-linear function c(X)=c(Id,y), rather than the linear matrix multiplication C*X.

This update combines the y-position estimate from the IMU with the y-position observation from the field measurement. If the field model given by c(X) is wrong due to the presence of multiple conductors that create field distortion (i.e., the presumed single conductor model is wrong), then the EKF will not adjust the predicted navigation and bias states to the correct values. The discriminator monitors the state vector X and the covariance matrix P and checks for divergence from reasonable values and excessive jumps. If either phenomenon occurs, discriminator 902 flags the user on display 101. The user can then decide to perform a walkover operation per the method disclosed in the '696 application to determine the actual conductor configuration.

As was the case for the tightly coupled sensor fusion case, a continuous depth output is also available in the ultra-tightly coupled scenario. In fact for the Null coil, the depth itself is a member of the state vector. For the L/R coil, the product of Id is tracked, and while the single conductor model remains valid, the current can be calculated using the expression at the centerline:

$$h_b(cl) = \frac{I}{d} \tag{37}$$

Then at off-centerline positions, the depth can be computed using this current to provide a continuous depth output to the user.

Likewise, and for very similar reasons as the EM locator, an ultra-tightly coupled sensor fusion of inertial and GPR sensors is useful. In the tightly coupled case, the radar signal velocity v is assumed to be constant, which might not be generally true even at a single locate site. If v is added to the state vector, then v can be updated along with all the other states. To see how this is done, define a normalization function:

$$y_r = \frac{2}{\eta} \frac{g_d}{g_s^2} v^2 \tag{38}$$

where $y_r$ is the off-centerline state variable for the GPR locator, and n is the separation distance between the two antennas of the GPR assembly.

Figure 12:
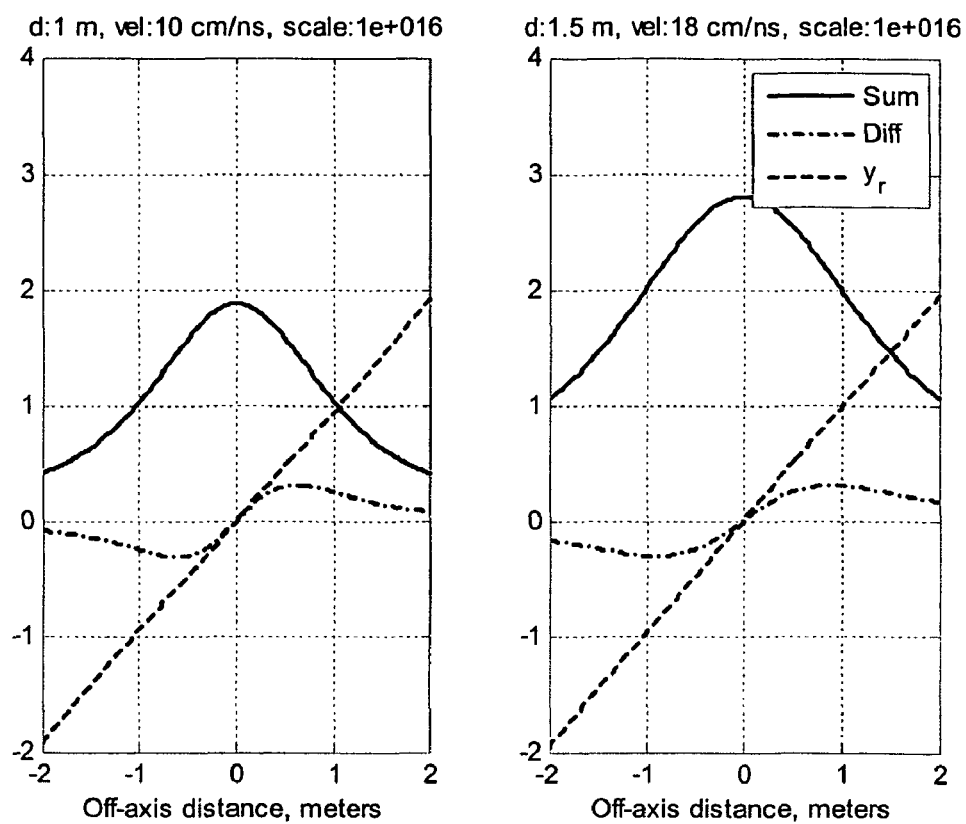

FIG. 12 shows computed values of $y_r$ as a function of known off-centerline position. The slope of the line is again one, such that $y_r$ is linear in the measurement of $$\frac{g_d}{g_s^2}$$

for a fixed v. In the plots on the left, d=1 m, v=10 cm/ns, and in the other plot on the right, d=1.5 m, v=18 cm/ns. At startup of the Kalman filter, v is initialized as before using the EM locator on a metallic line (detectable by both the EM and GPR locators).

Then the state vector is chosen as:

$$X = [x y z \dot{x} \dot{y} \dot{z} q_1 q_2 q_3 q_4 b_x b_y b_z b_{A_x} b_{A_y} b_{A_z} v]^T \tag{39}$$

The propagation of the state vector is upon each measurement of $$\frac{g_d}{g_s^2},$$

as well as the inertial sensor data as described by input vector (EQN. 5). Because $$\frac{g_d}{g_s^2} = c(v, y) = \frac{\eta}{2} v^{-2} y \qquad (40)$$

then the Jacobian C of the observation function c, is $$C = \frac{\partial c}{\partial X} = \begin{bmatrix} 0 & \frac{\eta}{2} v^{-2} & 0 & 0 & 0 & 0 & 0 & 0 & 0 & 0 & 0 & 0 & 0 & 0 & 0 & -\eta v^{-3} & y \end{bmatrix} \qquad (41)$$

As before, the Jacobian matrix C is evaluated at each observation time with the current state vector values, then used in the EKF update EQNs. 33-36. Now both the off-centerline distance y and the radar signal velocity are updated continuously, based on the optimal fusion of the inertial and radar sensors using the Extended Kalman Filter.

EQN. 38 represents a reasonable choice for driving the simple L/R display 203 needed to make the GPR system seem as simple to operate as an EM locator. In fact, since EQNs. 38, 25, and 26 all are normalized and linear in the measured input parameters ($h_v$, $h_b$, or $h_d$ for EM locate mode; $g_d$ or $g_s$ for GPR mode), then a simple display compression scheme, like:

$$lr = 1 - \exp(-y), y > 0$$

$$lr = 1 - \exp(y), y <= 0 \qquad (42)$$

allows a presentation of the L/R signal in a compressed and normalized format. This is necessary since the L/R display 203 has fixed endpoints, and should not saturate the farther one moves away from the centerline.

Figure 13:
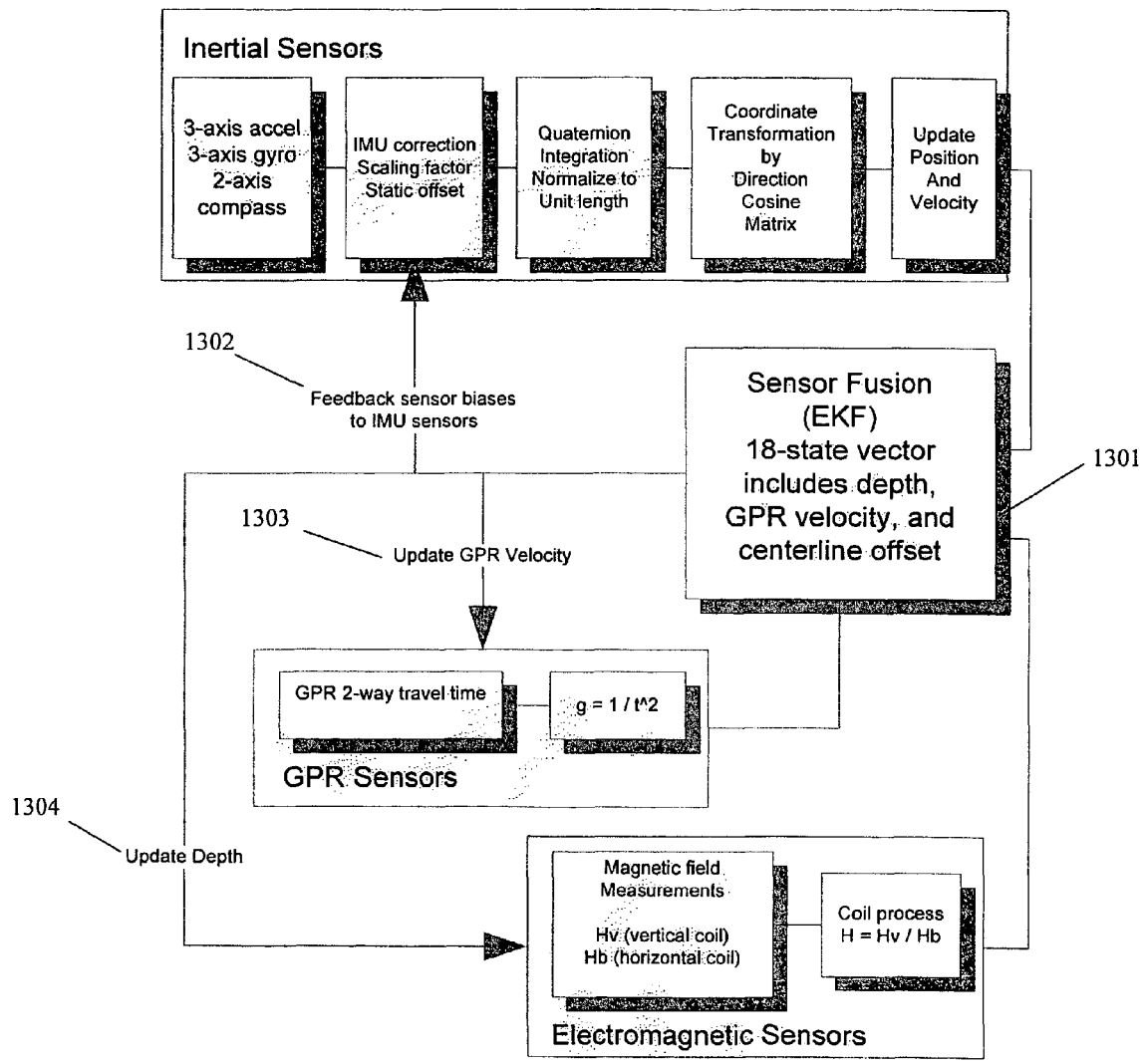
FIG. 13 illustrates an embodiment of the present invention in an ultra-tightly coupled sensor fusion model that combines sensors from GPR, EM, and inertial measurement systems.

Finally, in a kind of unified state-space model that can be used on-site to calibrate parameters of the combined EM and GPR locator, consider an ultra-tightly coupled sensor fusion problem that includes inertial, EM, and GPR states in the model. As depicted in FIG. 13, this is useful when a conductive utility line can be seen by both the EM and GPR system, which as mentioned before, is a common situation at locate sites. In fact, often such underground conductors lie in the same trench as non-metallic pipes, so that if a calibration method exists to jointly determine parameters like the radar velocity, or the dielectric constant, the accuracy of both systems will be improved.

As before, for the combined system, which uses a Null coil to detect the EM Left/Right position, choose the 18-state vector complemented by the states d and v:

$$X = [xyz\dot{x}\dot{y}\dot{z}q_1 q_2 q_3 q_4 b_x b_y b_z b_{\Delta p} b_{\Delta q} b_{\Delta r} vd]^T \qquad (43)$$

so the depth and radar signal velocity coexist in X The propagation of the state vector is upon each measurement of $$\frac{g_d}{g_s^2} \text{ and } \frac{h_v}{h_b},$$

as well as the inertial sensor data as described by input vector (EQN. 5). Because from EQNs. 26 and 38, an observation of a combined EM and GPR measurement is formed:

$$\frac{h_b}{h_v} \frac{g_d}{g_s^2} = c(v, d) = M \frac{\eta}{2} dv^{-2} \qquad (44)$$

then the Jacobian C of the observation function c, is $$C = \frac{\partial c}{\partial X} = \begin{bmatrix} 0 & 0 & 0 & 0 & 0 & 0 & 0 & 0 & 0 & 0 & 0 & 0 & 0 & 0 & 0 & -M\eta dv^{-3} & M\frac{\eta}{3} v^{-2} \end{bmatrix} \qquad (45)$$

The Jacobian matrix C is evaluated at each observation time with the current state vector values, then once again used in the EKF update EQNs. 33-36. Now, in the unified state-space model 1301, jointly combining sensor elements from the both locator modes and the inertial sensors, biases 1302 to the off-centerline distance y, the radar signal velocity 1303, and the depth 1304 are updated continuously, based on the optimal methods of the EKF.

The expressions used in the embodiments of the invention described above have easy analytic solutions for the partial derivatives in the Jacobian matrix C. This is due in part to the normalization functions (EQNs. 38, 25, and 26) that are linear in the measured input parameters. The sensor fusion problem is still tractable if the fundamental measurements ($h_v$, $h_b$, or $h_d$ for EM locate mode; g, $g_d$ or $g_s$ for GPR mode), rather than normalized measurements are used. Numerical solutions for the partial derivatives exist if the functions (EQNs. 13-16, and 21-24) are used directly, and there are many documented algorithms that can compute these solutions should the need arise for specific implementations. Further, even those functions may become more complex when various assumptions are dropped. For example, in the case of the EM field equations, the assumption the soil conductivity is treated as constant (per discussion in the '696 application) could be eliminated. In the GPR subsystem, simple analytic solutions to the Jacobian were possible by the expression in EQN. 38, where $y_r$ is linear in an aggregate observation of $g_d$ and $g_s$. But because the Jacobian assumes only that the partial derivatives of each state with respect to any other state are piecewise linear over the state propagation interval, the simple assumptions framed herein (that allow nice analytical mathematics) can be dropped, and a more brute force method employed.

Many such complications in the model can be accommodated in the methods described above, using the same fundamental approach to EM/GPR/inertial sensor fusion via the Kalman Filter.

The embodiments described herein are examples only of the invention. Other embodiments of the invention that are within the scope and spirit of this disclosure will be apparent to those skilled in the art from consideration of the specification and practice of the invention disclosed herein. It is intended that the specification and examples be considered as exemplary only and not limiting. The scope of the invention, therefore, is limited only by the following claims.

What is claimed is:

1. An underground pipe and cable locator system, comprising:
   one or more field sensors to detect a field from an underground pipe or cable;
   one or more inertial positioning sensors; and
   a filter that fuses signals from the one or more field sensors and the one or more inertial positioning sensors to provide real-time position and field values of the underground pipe or cable relative to the locator system, wherein the real-time position includes a centerline location and a depth of the underground pipe or cable.

2. The system of claim 1, wherein the filter is a Kalman filter.

3. The system of claim 1, wherein the one or more field sensors includes electromagnetic field sensors.

4. The system of claim 1, wherein the one or more field sensors includes ground penetrating radar sensors.

5. The system of claim 1, wherein the filter treats the one or more field sensors and the one or more inertial positioning sensors as loosely coupled sensors.

6. The system of claim 1, wherein the filter treats the one or more field sensors and the one or more inertial positioning sensors as tightly coupled sensors.

7. The system of claim 1, wherein the filter treats the one or more field sensors and the one or more inertial positioning sensors as ultra-tightly coupled sensors.

8. The system of claim 1, wherein the depth of the underground pipe or cable is continuously calculated.

9. The system of claim 1, wherein the one or more field sensors includes a radar emitting antenna, and a first radar detecting antenna.

10. The system of claim 9, wherein the one or more field sensors further includes a second radar detecting antenna.

11. The system of claim 1, wherein the one or more inertial position sensors includes sensors chosen from the group consisting of accelerometers, gyroscopes, magneto resistive sensors, and digital compasses.

12. The system of claim 1, further including a GPS receiver to provide an absolute position.

13. The system of claim 1, wherein the filter, in each time period, provides an updated state vector based on signals from the one or more field measurement sensors and the one or more inertial position sensors.

14. The system of claim 13, wherein the state vector X includes position, velocity, angular orientation, and bias parameters.

15. The system of claim 14, wherein the angular orientation parameters are quaternion parameters.

16. The system of claim 15, wherein the state vector also includes a depth parameter formed of the underground pipe or cable.

17. The system of claim 15, wherein the state vector also includes a depth parameter formed by the product of a current in the underground pipe or cable and the depth of the underground pipe or cable.

18. The system of claim 15, wherein the state vector also includes a velocity parameter.

19. The system of claim 15, wherein the state vector further includes both a velocity parameter and a depth parameter.

20. The system of claim 15, wherein the state vector includes linearized parameters from an EM mode.

21. The system of claim 15, wherein the state vector includes linearized parameters from a GPR mode.

22. The system of claim 13, wherein the state vector is updated according to $X=AX+BU$, where A is the state transition matrix, B is the input mapping matrix, and U is the forcing function vector.

23. The system of claim 1, further including a mapping module that stores position and field values to create an electronic map of the position of the underground pipe or cable.

24. The system of claim 1, further including one or more position locator devices, wherein the one or more position locator devices determine the position of the line locator system relative to a fixed point.

25. The system of claim 17, wherein the one or more position locator devices includes one or more of a group consisting of a GPS system, a laser range finder, and stereoscope range finder.

26. A method of locating an underground pipe or cable, comprising:
   measuring one or more field values;
   measuring one or more inertial navigation values; and
   fusing the one or more field values with the one or more inertial navigation values to obtain accurate values for the real-time location of the underground pipe or cable relative to a locator, wherein the real-time position includes a centerline location and a depth of the underground pipe or cable.

27. The method of claim 26, wherein measuring one or more field values includes measuring one or more values of magnetic field strength.

28. The method of claim 26, wherein measuring one or more field values includes measuring one or more values of time for signal return in a ground penetrating radar system.

29. The method of claim 26, wherein measuring one or more inertial navigation values includes measuring one or more parameters for a set consisting of linear acceleration, angular acceleration, and Earth magnetic field direction.

30. The method of claim 26, wherein fusing the one or more field values with the one or more inertial parameter values includes:
   forming a state vector from the one or more inertial parameter values;
   receiving one or more external position parameters; and
   utilizing a Kalman filter to update the state vector.

31. The method of claim 30, further including performing a walkover determination utilizing the one or more field values.

32. The method of claim 26, wherein fusing the one or more field values with the one or more inertial parameter values includes:
   forming a state vector from the one or more inertial parameter values; and
   updating the state vector utilizing a Kalman filter and the one or more field values.

33. The method of claim 26, wherein fusing the one or more field values with the one or more inertial parameter values includes forming a state vector from the one or more inertial parameter values and the one or more field values; and updating the state vector utilizing a Kalman filter.

34. An underground pipe and cable locator, comprising:
means for receiving one or more field values from an underground pipe or cable;
means for receiving one or more inertial position values; and
means for fusing the one or more field values with the one or more inertial position values to provide real-time position and field values of the underground pipe or cable relative to the locator, wherein the real-time position includes a centerline location and a depth of the underground pipe or cable.

35. The locator of claim 34, wherein the means for fusing includes a Kalman filter.

36. The locator of claim 34, wherein the means for receiving one or more field values includes means for receiving electromagnetic values from the underground pipe or cable.

37. The locator of claim 34, wherein the means for receiving one or more field values includes means for receiving ground penetrating radar values from the underground pipe or cable.

38. An underground pipe and cable locator system, comprising:
one or more electromagnetic field sensors to detect an electromagnetic field from the underground pipe or cable and from which field parameters are determined;
one or more inertial positioning sensors from which position data is determined; and
a filter that utilizes a state vector that includes position data, field parameters, and inertial sensor bias data, and wherein a real-time position of the underground pipe or cable relative to the locator system is determined from the state vector, and wherein the real-time position includes a centerline location and a depth of the underground pipe or cable.

39. The locator system of claim 38, wherein the state vector is given by $$X=[xyz\dot{x}\dot{y}\dot{z}q_1q_2q_3q_4b_xb_{\dot{y}}b_zb_{\Delta p}b_{\Delta q}b_{\Delta r}Id],$$

where x, y, and z represent position relative to the locator system, $\dot{x}$, $\dot{y}$, and $\dot{z}$ are first derivatives with respect to time of the positions x, y, and z, $q_1$, $q_2$, $q_3$, and $q_4$ are quaternion states, $b_x$, $b_{\dot{y}}$, $b_z$, $b_{\Delta p}$, $b_{\Delta q}$, and $b_{\Delta r}$, are inertial sensor bias adjustments, and Id is derived from $y_d=LId(h_d/h_b^2)$ where $y_d$ is an off-centerline state variable for a L/R coil configuration, I is current, d is a depth of the pipe or cable, $h_d$ is a difference component of the magnetic field, $h_b$ is a horizontal component of the magnetic field, and L is a parameter that sets a slope of $y_d$ to 1.

40. The locator system of claim 38, wherein the state vector is given by $$X=[xyz\dot{x}\dot{y}\dot{z}q_1q_2q_3q_4b_xb_{\dot{y}}b_zb_{\Delta p}b_{\Delta q}b_{\Delta r}d],$$

where x, y, and z represent position relative to the locator system, $\dot{x}$, $\dot{y}$, and $\dot{z}$ are first derivatives with respect to time of the positions x, y, and z, $q_1$, $q_2$, $q_3$, and $q_4$ are quaternion states, $b_x$, $b_{\dot{y}}$, $b_z$, $b_{\Delta p}$, $b_{\Delta q}$, and $b_{\Delta r}$, are inertial sensor bias adjustments, and d is derived from $y_v=Md(h_v/h_b)$ where $y_v$ is an off-centerline state variable for a null-coil configuration, d is a depth of the pipe or cable, $h_v$ is a vertical component of a magnetic field at the null coil, $h_b$ is a horizontal component of the magnetic field, and M is a parameter that sets a slope of $y_v$ to 1.

41. The locator system of claim 38, wherein the field parameter is current.

42. The locator system of claim 38, wherein the field parameter is depth calculated from $y_v=Md(h_v/h_b)$.

43. The locator system of claim 38, wherein the filter corrects inertial sensor bias data utilizing the field parameters.

44. The locator system of claim 38, wherein the position includes a depth of the pipe or cable, which is continuously presented to a user in real time.

45. The locator system of claim 44, wherein the position includes a right/left indication directing the user towards a point over the center of the pipe or cable.

46. The locator system of claim 38, wherein the filter is a Kalman filter.

47. A method of locating an underground cable or pipe, comprising:
receiving electromagnetic signals from one or more electromagnetic field sensors that detect an electromagnetic field from the underground pipe or cable;
determining field parameters from the electromagnetic signals;
receiving inertial signals from one or more inertial positioning sensors;
determining position data from the inertial signals; and
filtering, utilizing a state vector that includes position data, field parameters, and inertial sensor bias data, to determine a real-time position of the underground pipe or cable relative to the locator system, and wherein the real-time position includes a centerline location and a depth of the underground pipe or cable.

48. The method of claim 47, wherein the state vector is given by $$X=[xyz\dot{x}\dot{y}\dot{z}q_1q_2q_3q_4b_xb_{\dot{y}}b_zb_{\Delta p}b_{\Delta q}b_{\Delta r}Id],$$

where x, y, and z represent position relative to the locator system, $\dot{x}$, $\dot{y}$, and $\dot{z}$ are first derivatives with respect to time of the positions x, y, and z, $q_1$, $q_2$, $q_3$, and $q_4$ are quaternion states, $b_x$, $b_{\dot{y}}$, $b_z$, $b_{\Delta p}$, $b_{\Delta q}$, and $b_{\Delta r}$, are inertial sensor bias adjustments, and Id is derived from $y_d=LId(h_d/h_b^2)$ where $y_d$ is an off-centerline state variable for a L/R coil configuration, I is current, d is a depth of the pipe or cable, $h_d$ is a difference component of the magnetic field, $h_b$ is a horizontal component of the magnetic field, and L is a parameter that sets a slope of $y_d$ to 1.

49. The method of claim 47, wherein the state vector is given by $$X=[xyz\dot{x}\dot{y}\dot{z}q_1q_2q_3q_4b_xb_{\dot{y}}b_zb_{\Delta p}b_{\Delta q}b_{\Delta r}d],$$

where x, y, and z represent position relative to the locator system, $\dot{x}$, $\dot{y}$, and $\dot{z}$ are first derivatives with respect to time of the positions x, y, and z, $q_1$, $q_2$, $q_3$, and $q_4$ are quaternion states, $b_x$, $b_{\dot{y}}$, $b_z$, $b_{\Delta p}$, $b_{\Delta q}$, and $b_{\Delta r}$, are inertial sensor bias adjustments, and d is derived from $y_v=Md(h_v/h_b)$ where $y_v$ is the off-centerline state variable for a null-coil configuration, d is the depth of the pipe or cable, $h_v$ is a vertical component of a magnetic field at the null coil, $h_b$ is a horizontal component of the magnetic field, and M is a parameter that sets a slope of $y_v$ to 1.

50. The method of claim 47, wherein the field parameters include current.

51. The method of claim 47, wherein the field parameters include depth calculated from $y_v=Md(h_v/h_b)$.

52. The method of claim 47, wherein filtering includes correcting inertial sensor bias data utilizing the field parameters.

53. The method of claim 47, wherein the position includes a depth of the pipe or cable and further including continuously presenting the depth to a user in real time.

54. The method of claim 53, wherein the position includes a right/left indication, and further including directing the user towards a point over the center of the pipe or cable with the right/left indication.

55. The method of claim 47, wherein filter including utilizing a Kalman filter.

* * * * *